United States Patent [19]

George et al.

[11] Patent Number: 4,834,474

[45] Date of Patent: May 30, 1989

[54] OPTICAL SYSTEMS USING VOLUME HOLOGRAPHIC ELEMENTS TO PROVIDE ARBITRARY SPACE-TIME CHARACTERISTICS, INCLUDING FREQUENCY-AND/OR SPATIALLY-DEPENDENT DELAY LINES, CHIRPED PULSE COMPRESSORS, PULSE HIRPERS, PULSE SHAPERS, AND LASER RESONATORS

[75] Inventors: Nicholas George, Pittsford; Thomas W. Stone, Rochester, both of N.Y.

[73] Assignee: The University of Rochester, Rochester, N.Y.

[21] Appl. No.: 45,991

[22] Filed: May 1, 1987

[51] Int. Cl.⁴ .......................... G02B 5/32; H01S 3/08; H01S 3/1055

[52] U.S. Cl. ..................................... 350/3.65; 350/3.7; 372/25; 372/102; 372/700

[58] Field of Search ................... 350/3.65, 3.7, 162.21, 350/168; 372/25, 102, 700

[56] References Cited

U.S. PATENT DOCUMENTS

| | | | |
|---|---|---|---|
| 3,443,243 | 5/1969 | Patel | 372/20 |
| 3,491,343 | 1/1970 | Cook | 365/64 |
| 3,578,845 | 5/1971 | Brooks et al. | 350/162.2 |
| 3,614,192 | 10/1971 | Preston | 350/3.73 |
| 3,614,193 | 10/1971 | Beiser | 350/3.65 |
| 3,666,345 | 5/1972 | Maslowski | 350/3.61 |
| 3,691,477 | 9/1972 | Janney | 372/94 |
| 3,698,010 | 10/1972 | Lee | 365/122 |
| 3,737,212 | 6/1973 | Antonson et al. | 350/174 |
| 3,753,148 | 8/1973 | Billman | 372/20 |
| 3,809,453 | 5/1974 | Ruell et al. | 350/3.79 |
| 3,883,216 | 5/1975 | Lee | 350/3.65 |
| 3,886,363 | 5/1975 | Ohnishi et al. | 250/364 |
| 3,905,674 | 9/1975 | Ruell et al. | 350/3.79 |
| 3,928,817 | 12/1975 | Chodzko | 372/95 |
| 3,940,204 | 2/1976 | Withrington | 350/3.72 |
| 3,973,850 | 8/1976 | Pouey | 356/334 |
| 4,028,636 | 6/1977 | Hughes | 372/20 |
| 4,040,056 | 8/1977 | Pekau | 342/179 |
| 4,068,954 | 1/1978 | Da Silva | 356/334 |
| 4,087,183 | 5/1978 | Passereau | 356/305 |
| 4,140,362 | 2/1979 | Tien | 350/372 |
| 4,229,710 | 10/1980 | Shoshan | 372/102 |
| 4,247,831 | 1/1981 | Lindop | 372/94 |
| 4,262,996 | 4/1981 | Yao | 350/96.19 |
| 4,287,486 | 9/1981 | Javan | 372/20 |
| 4,298,845 | 11/1981 | Laude | 372/99 |
| 4,339,168 | 7/1982 | Haines | 350/3.69 |
| 4,361,889 | 11/1982 | Johnson | 372/95 |
| 4,384,759 | 5/1983 | Ferrante | 350/3.7 |
| 4,432,597 | 2/1984 | Bjorklund et al. | 350/3.7 |
| 4,455,088 | 6/1984 | Koike | 356/334 |
| 4,458,977 | 7/1984 | Arns et al. | 350/3.6 |
| 4,530,564 | 7/1985 | Close | 350/3.69 |
| 4,531,809 | 7/1985 | Carter et al. | 350/96.19 |
| 4,559,500 | 12/1985 | McDermid et al. | 330/4.3 |
| 4,626,679 | 12/1986 | Kuwayama et al. | 250/227 |
| 4,688,880 | 8/1987 | Tatsuno et al. | 350/3.72 |
| 4,750,809 | 6/1988 | Kafka et al. | 350/320 X |

FOREIGN PATENT DOCUMENTS

| | | | |
|---|---|---|---|
| 2033931 | 1/1972 | Fed. Rep. of Germany | 350/162.21 |
| 141578 | 5/1980 | German Democratic Rep. | 350/3.7 |

OTHER PUBLICATIONS

Grischkowsky, D., et al., *Appl. Phys. Lett.* 41 (1), Jul. 1, 1982, pp. 1-3.

(List continued on next page.)

*Primary Examiner*—Bruce Y. Arnold
*Assistant Examiner*—David J. Edmondson
*Attorney, Agent, or Firm*—Martin LuKacher

[57] ABSTRACT

Optical systems, using volume holographic elements (gratings) having geometries which tailor the spatio-temporal dispersion of the optical pulses for the system. The input optical pulse is characterized by a frequency variation across the temporal profile of the pulse. The various frequency components of this pulse are first dispersed by at least one grating which may be of the blazed reflection or holographic volume transmission type. The resultant dispersed light is then diffracted by a holographic volume grating which imparts the desired temporal dispersion characteristics to the pulse. The shape of the holographic element will vary according to the input pulse frequency profile as formed by varied chirping techniques.

40 Claims, 36 Drawing Sheets

U.S. PATENT DOCUMENTS

Miranda, R. S., et al., *Optics Letters* vol. 11, No. 4, Apr. 1986, pp. 224-226.

Mollenauer, L. F., et al., *Fiberoptic Technology*, Apr., 1982, pp. 193-198.

Knox, W. H., et al., *Appl. Phys. Lett* 46 (12), Jun. 15, 1985, pp. 1120-1121.

Halbout, J. M., et al., *Appl. Phys. Lett.* 45 (12), Dec. 15, 1984, pp. 1281-1283.

Hirschfeld, T., et al., *J. Opt. Soc. Am.*, vol. 68, No. 1, Jan. 1978, pp. 28-32.

Sincerbox, G. T., *IBM Tech. Disc. Bull.*, vol. 10, No. 3, Aug. 1967, pp. 267-268.

Leith, et al., J. Opt. Soc. Am. 52, 1123 (1962).

George, et al., App. Phys. Let. 9, 212 (1966).

Stone, et al., Opt. Lett. 7, 445 (1982).

Stone et al., Appl. Opt., 24, 3797 (1985).

O. E. Martinez, Journal of Quantum Electronics, vol. QE-23, No. 1, Jan. 1987, p. 59.

P. P. Ho et al. Journal of Optical Society of America A vol. 2, No. 13, Dec. 1985, p. 46.

W. Dietel et al., Optics Letters, vol. 8, No. 1, Jan. 1983, p. 4.

E. B. Treacy, IEEE J. of Quantum Electronics, vol QE-5, No. 9, Sep. 1969, p. 454.

C. V. Shank et al., Applied Physics Letters, 40(9) May 1, 1982, p. 761.

B. Nikolaus et al., Applied Physics Letters, 43(3) Aug. 1, 1983, p. 28.

B. Nikolaus et al., Applied Physics Letters, 42(1) Jan. 1, 1983, p. 1.

T. Damm, Optics Letters, vol. 10, No. 4, Apr. 1985, p. 176.

J. D. Kafka et al., Optics Letters, vol. 9, No. 11, Nov. 1984, p. 505.

S. L. Palfrey et al., Optics Letters, vol. 10, No. 11, Nov. 1985, p. 563.

B. Zysset, Optics Letters, vol. 11, No. 3, Mar. 1986, p. 156.

J. Desbois, IEEE J. of Quantum Electronics, vol. QE-9, No. 2, Feb. 1973, p. 213.

B. Colombeau, Optics Comm., vol. 19, No. 2, Nov. 1976, p. 201.

J. Agostinelli et al., Applied Optics, vol. 18, No. 14, Jul. 15, 1979, p. 2500.

A. M. Weiner et al., Optics Letters, vol. 11, No. 3, Mar. 1986, p. 153.

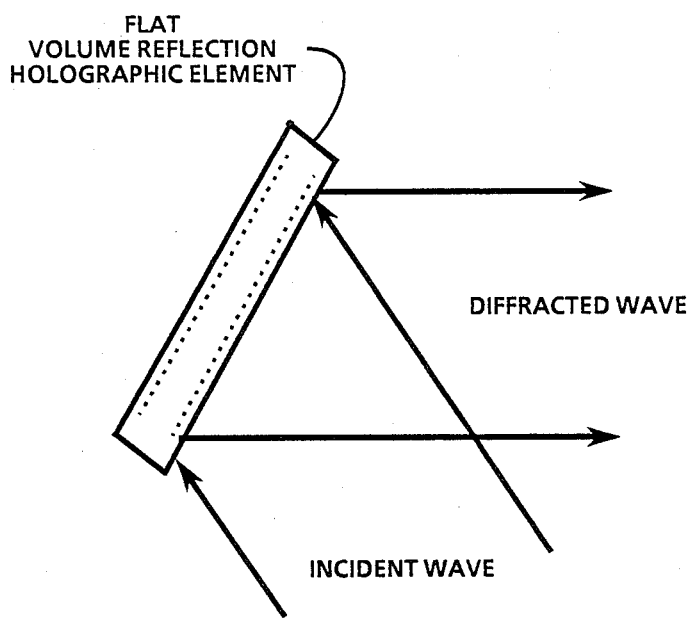
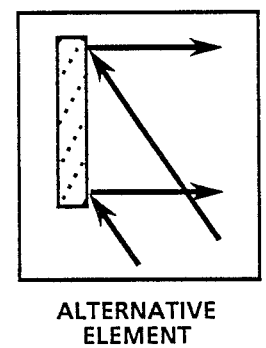
FIG. 5a
FIG. 5a'
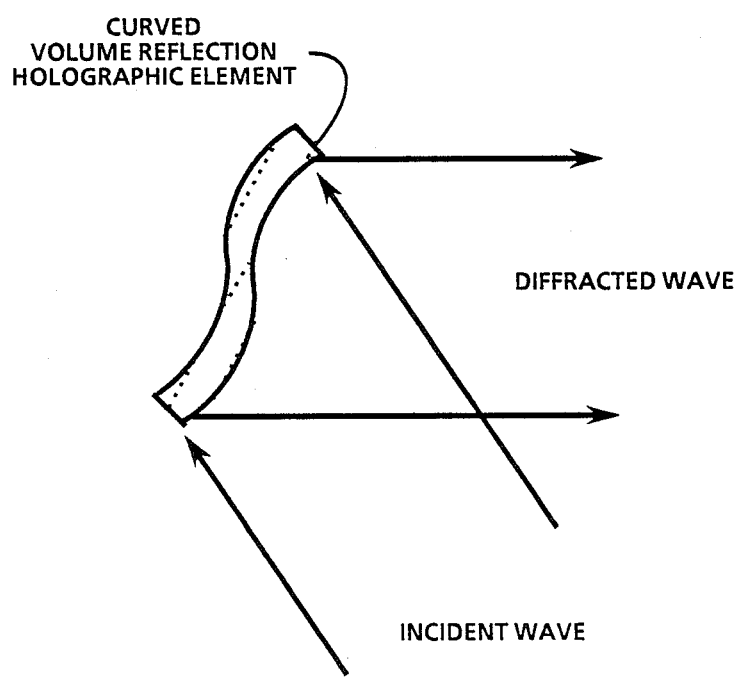
FIG. 5b

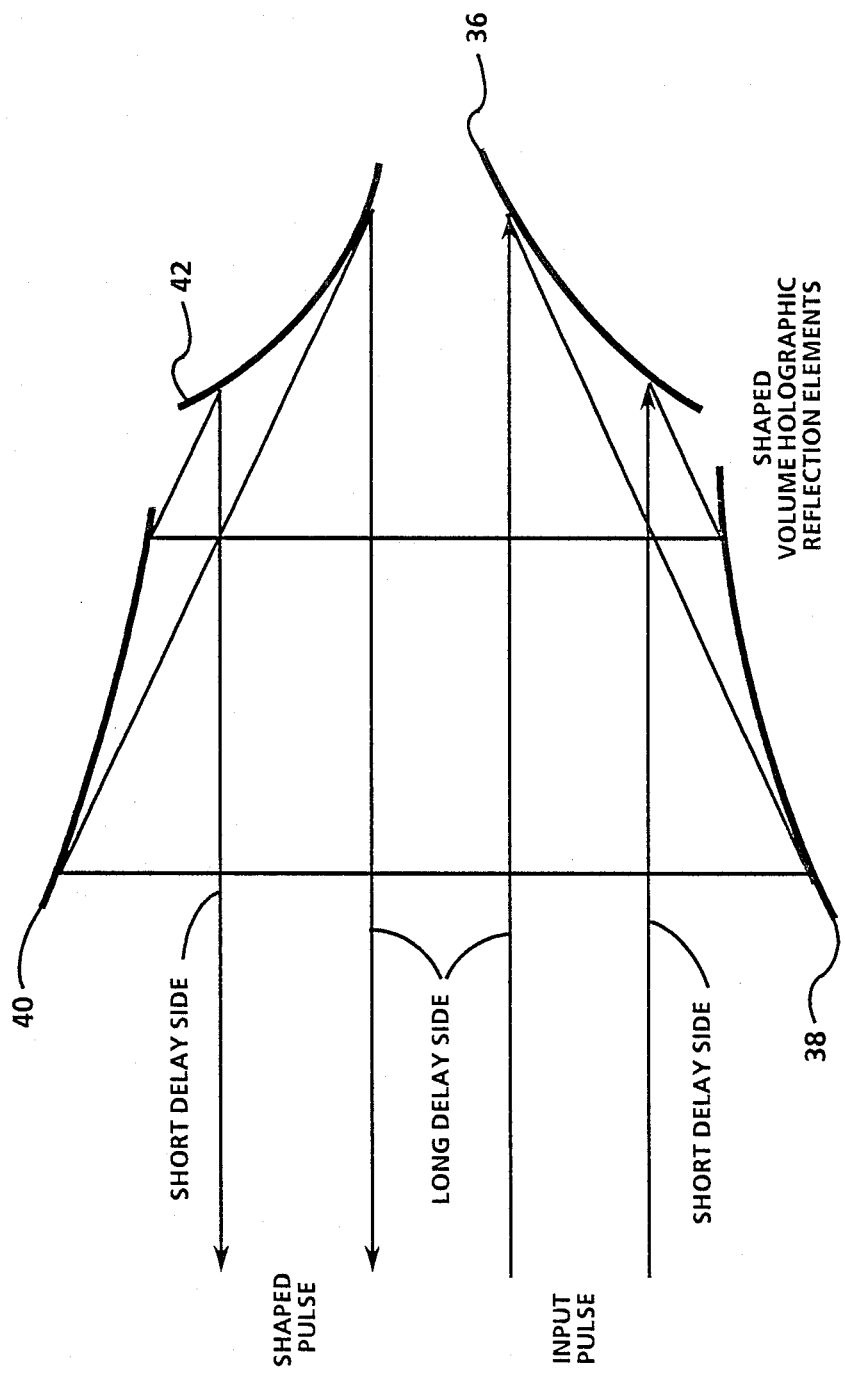

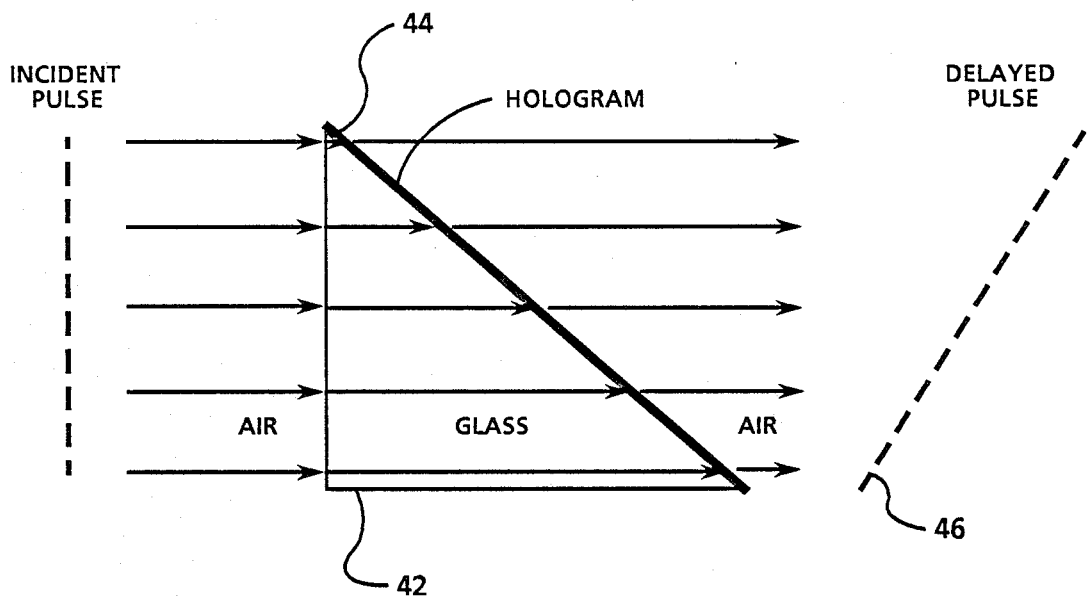
FIG. 9a
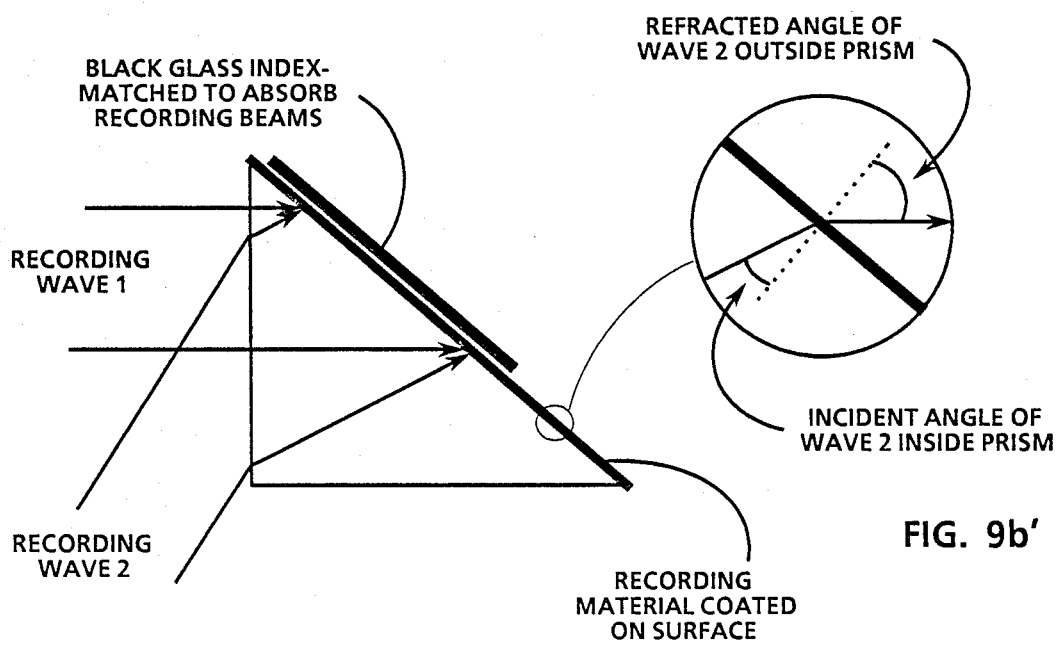
FIG. 9b'
FIG. 9b

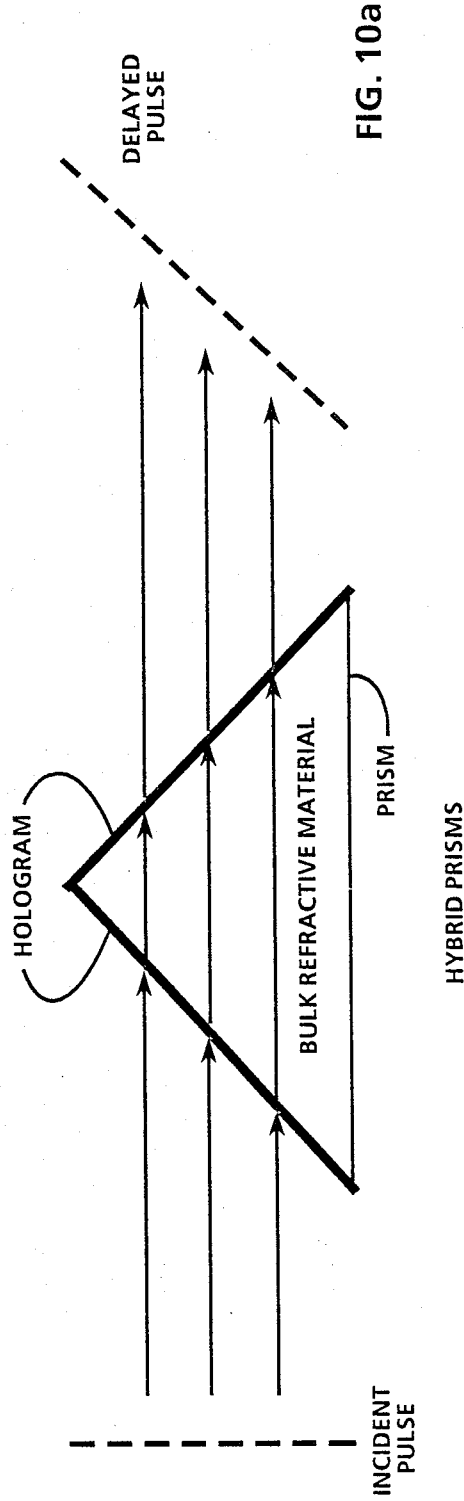
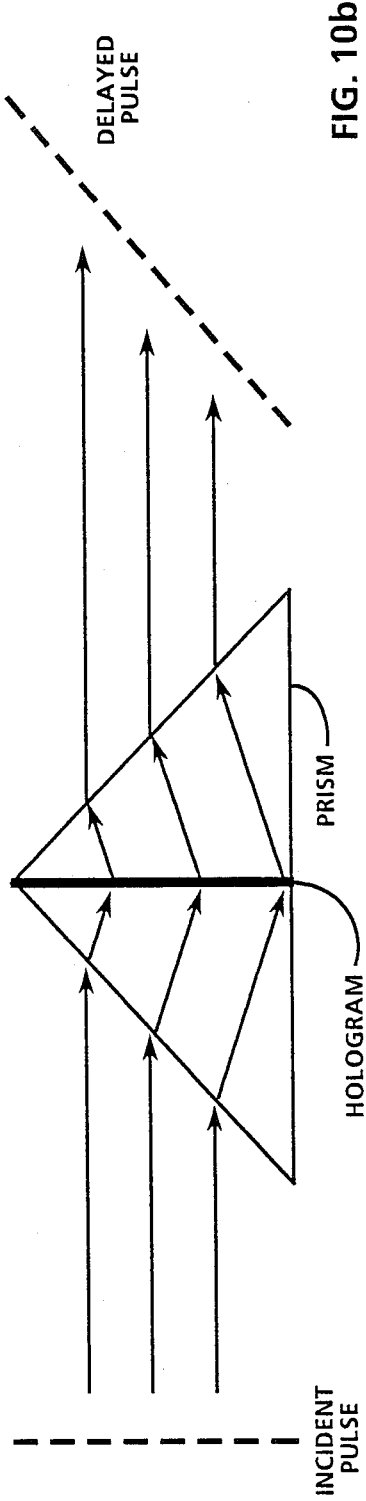
FIG. 10a
FIG. 10b

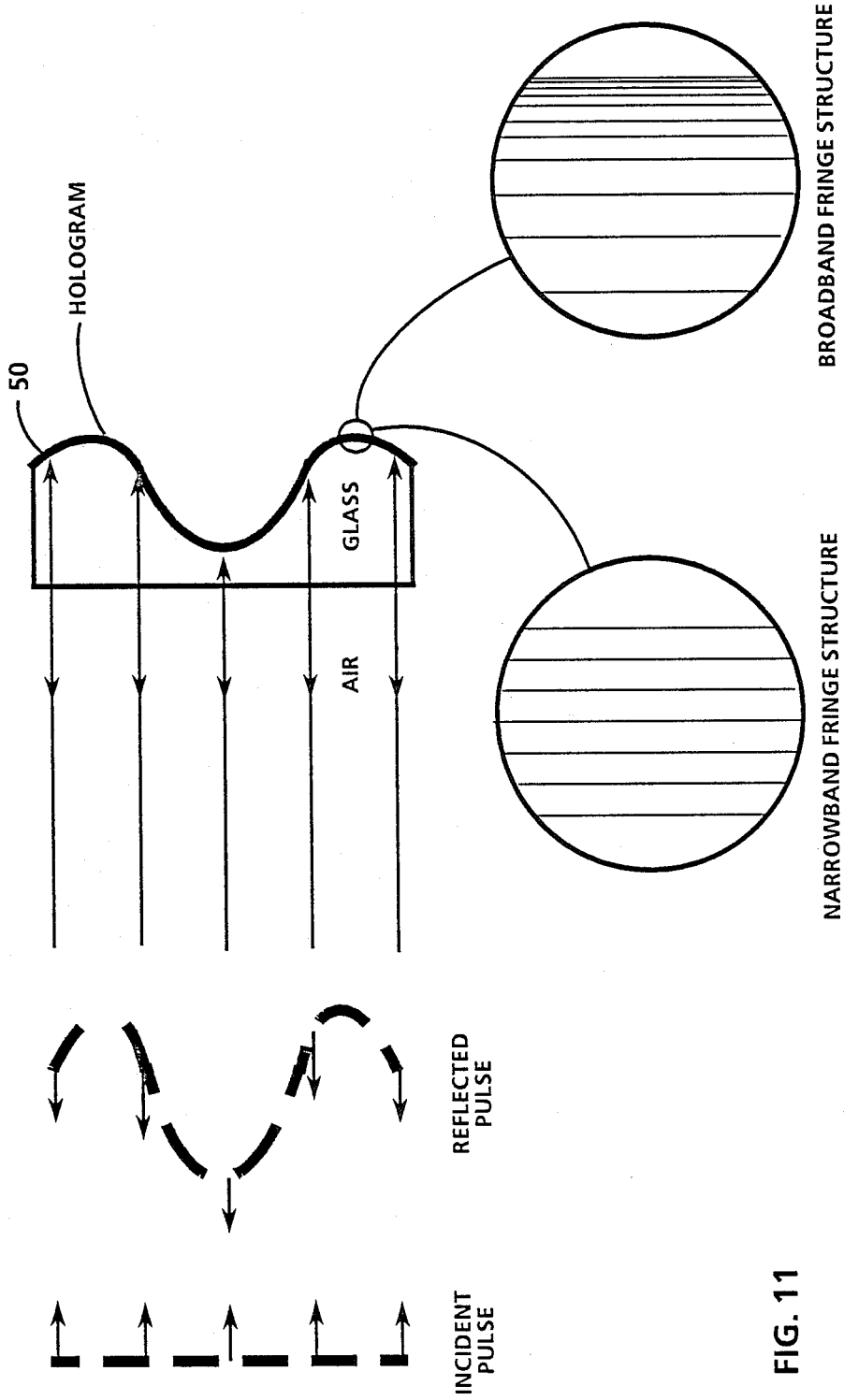

SHAPED HOLOGRAPHIC REFLECTOR FABRICATION

OPTICAL SYSTEMS USING VOLUME HOLOGRAPHIC ELEMENTS TO PROVIDE ARBITRARY SPACE-TIME CHARACTERISTICS, INCLUDING FREQUENCY-AND/OR SPATIALLY-DEPENDENT DELAY LINES, CHIRPED PULSE COMPRESSORS, PULSE HIRPERS, PULSE SHAPERS, AND LASER RESONATORS

The U.S. Government has rights in the invention of this application under Grant contracts AFOSR-84-0018 and DAAG29-83-K-0166.

DESCRIPTION

The present invention relates to optical systems which utilize diffractive elements which provide optical signals with desired space-time characteristics which may be selected from a broad range of frequency and-/or spatially dependent delay functions. More particularly the invention relates to optical systems having one or more diffractive elements, preferably volume holographic elements, having geometries arising from a predetermined curving or shaping thereof.

This invention is especially suitable for use in optical chirped pulse compressors, which without the subject invention, are limited in their performance by a mismatch of the temporal frequency profile of the input pulse and the fixed dispersion characteristic of conventional planar gratings heretofore used in such compressors. The invention will find application in frequency- and/or spatially-dependent delay lines to provide arbitrary space-time characteristics in optical pulse chirpers, pulse shapers, and laser resonators and wherever it is desired to introduce, in a controlled and variable manner, varied temporal delays into the various frequency and/or spatial components of an input "wave" pulse. Here "wave" is meant in a broad sense including waves of types or wavelengths with which volume transmission diffracting structures, e.g., volume holographic transmission elements, may be used.

This application is related to our co-pending U.S. patent application Ser. No. 922,913 filed Oct. 24, 1986 (now U.S. Pat. No. 4,752,130, issued June 21, 1988) and extends the technology of systems using volume holographic diffractive elements to systems, such as optical delay lines, compressors, chirpers, pulse shapers and lasers in which the gratings impart desired frequency- and/or spatially-dependent characteristics on optical signals.

Heretofore it has been proposed to use gratings in compressors, chirpers and laser cavities. See O. E. Martinez, Journal of Quantum Electronics, Vol. QE-23, No. 1, January 1987, page 59; P. P. Ho et al., Journal of the Optical Society of America A, Vol. 2, No. Dec. 13, 1985, page P46; W. Dietel et al., Optics Letters, Vol. 8, No. 12, January 1983, page 4; E. B. Treacy, IEEE Journal of Quantum Electronics, Vol. QE-5, No. 9, September 1969, page 454; C. V. Shank et al., Applied Physics Letters, 40 (9), 1 May, 1982, page 761; B. Nikolaus et al., Applied Physics Letters, 43 (3), Aug. 1, 1983, page 228; B. Nikolaus et al., Applied Physics Letters, 42 (1), Jan. 1, 1983, page 1; T. Damm, Optics Letters, Vol. 10, No. 4, April 1985, page 176; J. D. Kafka et al., Optics Letters, Vol. 9, No. 11, November 1984, page 505; S. L. Palfrey et al., Optics Letters, Vol. 10, No. 11, November 1985, page 563; B. Zysset, Optics Letters, Vol. 11, No. 3, March 1986, page 156; J. Desbois, IEEE Journal of Quantum Electronics, Vol. QE-9, No. 2, February 1973, page 213; B. Colombeau, Optics Communications, Vol. 19, No. 2, November 1976, page 201; J. Agostinelli et al., Applied Optics, Vol. 18, No. 14, July 15, 1979, page 2500; A. M. Weiner, et al., Optics Letters, Vol. 11, No. 3, March 1986, page 153; Janney, U.S. Pat. No. 3,691,477 issued Sept. 12, 1972; Brooks et al., U.S. Pat. No. 3,578,845 issued May 18, 1971; Javan, U.S. Pat. No. 4,287,486 issued Sept. 1, 1981; Hughes, U.S. Pat. No. 4,028,636 issued June 7, 1977; Johnson, U.S. Pat. No. 4,361,889 issued Nov. 30, 1982; Patel, U.S. Pat. No. 3,443,243 issued May 6, 1969; Chodzko, U.S. Pat. No. 3,928,817 issued Dec. 23, 1975; Billman, U.S. Pat. No. 3,753,148 issued Aug. 14, 1973; Shoshan, U.S. Pat. No. 4,229,710 issued Oct. 21, 1980; Laude, U.S. Pat. No. 4,298,845 issued Nov. 3, 1981; Yao, U.S. Pat. No. 4,262,996 issued Apr. 21, 1981; and Bjorklund, U.S. Pat. No. 4,432,597 issued Feb. 21, 1984.

In such planar-grating based pulse compressors, two factors typically impose severe limitations on the compression ratios achievable. The first of these is a nonlinearity in the input chirp (the frequency variation or profile of frequency with time). Specific chirp profiles depend on the method used to impart the frequency chirp, but typically (as in the case of fiber-chirpers) the center of the pulse experiences a linear frequency sweep; whereas the wings of the profile have complicated shapes including the opposite slope as compared to the central region. Thus if a pulse compressor imposed a perfectly linear temporal delay with frequency, only *part* of the pulse energy could be ideally collapsed, resulting in a limitation in the ultimate compression achievable.

The second factor limiting the performance of conventional pulse compressors is the inflexibility of temporal delay functions achievable with planar gratings. These temporal delays are approximately linear (as a function of frequency) over small spectral bands, but marked nonlinearities are introduced when the spectrum of the pulse becomes broad. Since these planar-grating delay functions depend on geometrical factors dictated by angular dispersions of gratings and the intersections of these spectrally distributed angles of the diffracted beams with other planes (containing gratings), their delay line characteristics are not matched with the input pulse chirp.

It has been discovered in accordance with the invention that diffractive elements can be configured to impart desired optical delays in the various frequency and/or spatial components of an input signal so that the output is produced with its frequency or spatial components in desired temporal profile or spatial position. Compressors using these gratings in accordance with the invention can be matched to the particular temporal frequency profile of the incident chirped optical pulse so as to eliminate the limitations described above on the achievable compression. The gratings which introduce the desired space-time characteristics in the various frequency or spatial components of the input wave are volume holographic diffraction gratings and may be used alone, with other gratings, or with other refractive or dispersed elements such as prisms and lenses, to impart in a controlled and variable manner the delays in the frequency and/or spatial components of the input wave in order to provide the desired output.

Holographic diffraction gratings for use in systems embodying the invention may be fabricated by recording in a suitable material the interference pattern formed when two coherent waves spatially overlap throughout a volume. The spatial period and volume distribution of this interference pattern is such that a volume holographic diffraction grating formed by recording this interference pattern throughout a sub-volume (usually defined by the bounds of the recording material used in the fabrication exposure) may be used to diffract light similar to one of the recording waves into the form of the other recording wave with extremely high efficiency. In the recording process, the volume fringe structure shape and orientation inherently satisfies the volume "Bragg" condition required for high diffraction efficiency. A feature of the elements made with the volume holographic recording procedure just described is that the efficient diffraction of one wavefront into a second is achieved independently of the shape of the recording material used in the above process, provided that the shape spans the desired aperture. Yet in a space-time sense, these variations in shape provide vastly different operational characteristics. These shaped holographic optical elements are at times referred to herein as "gratings" synonymously with "elements" in the following descriptions; even though as described later, the volume fringe structure of these elements is not rigidly repeating but rather spatially varying. By varying the shape of volume holographic gratings, nearly any desired space-time characteristics may be obtained.

When utilized in a chirped pulse compressor, for example, the shaped holographic gratings can provide vast varieties of temporal delays as a function of input pulse frequency components. Conversely such holographic dispersive delay lines may be used to form broad varieties of frequency chirped pulses (linear, etc.) from short input pulses. Holographic delay lines utilizing curved elements may also be used in the shaping and modification of ultrashort (broadband) and longer (narrow- and broad-band) pulses.

It is therefor the principal object of the invention to provide improved optical systems which include holographic diffraction elements having predetermined space-time properties, such as programmable, spatially dependent delay lines in which the desired spatio-temporal characteristics are programmed into the device by selecting appropriate element curvature, and include diffractive and hybrid diffractive/refractive delay lines in which the group delay may be made to vary spatially across the element aperture in a programmable fashion, or which are frequency dependent delay lines, and which also include pulse chirpers and chirped pulse compressors and laser resonators.

The foregoing and other objects, features and advantages of the invention as well as presently preferred embodiments thereof will become more apparent from a reading of the following description in connection with the accompanying drawings in which.

Figure 6A:
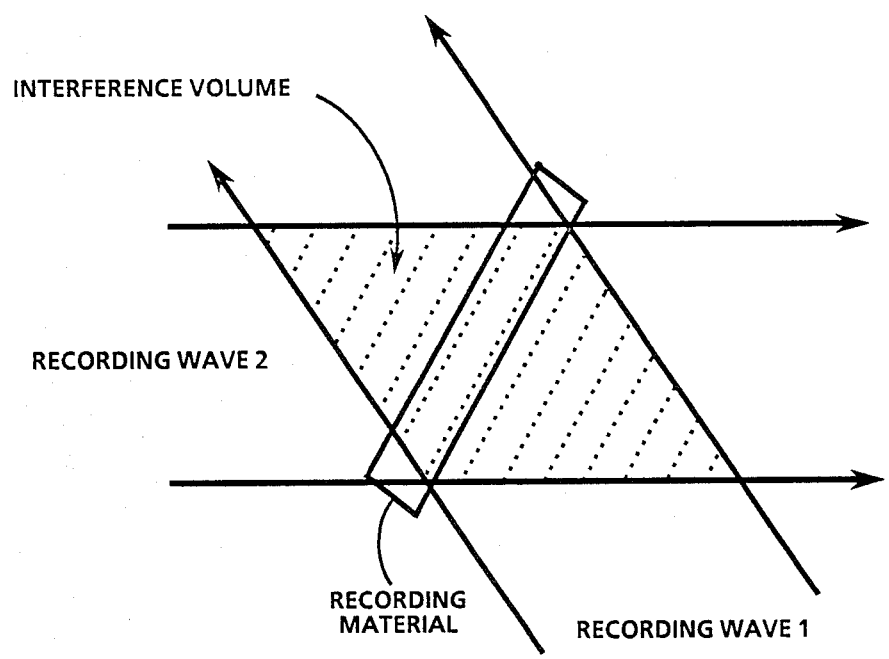
Figure 6B:
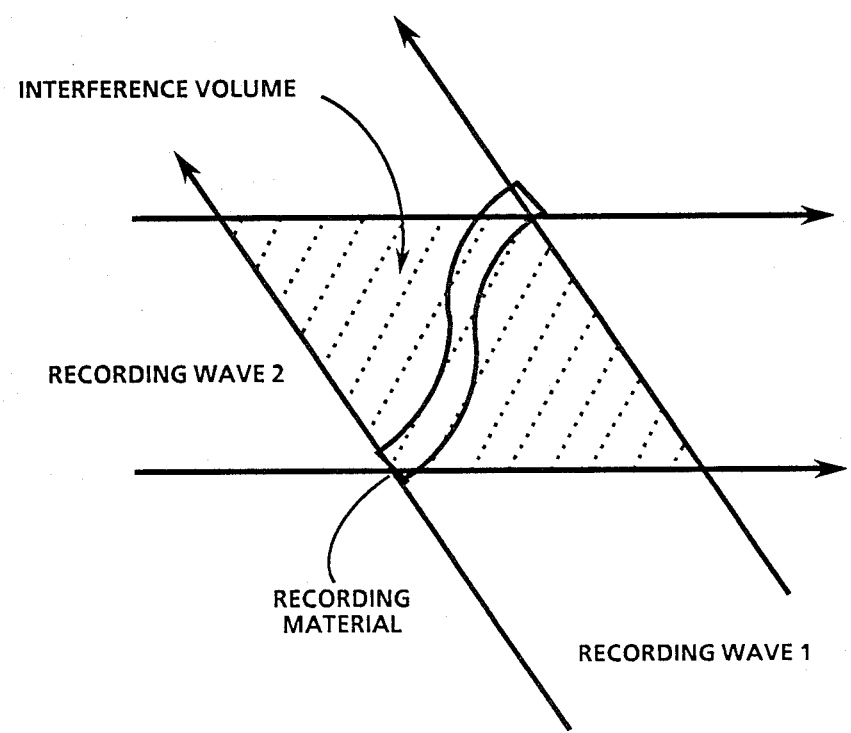
Figure 7:
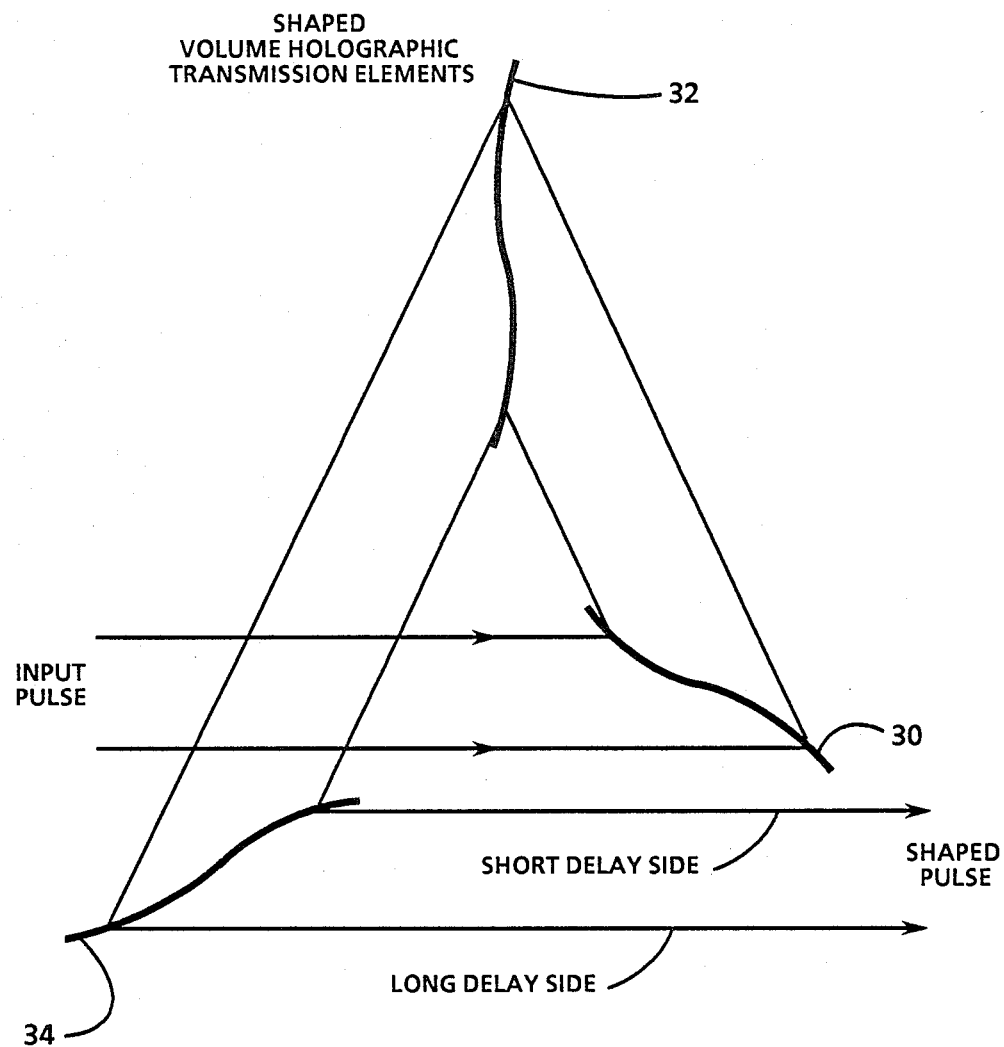
Figure 12:
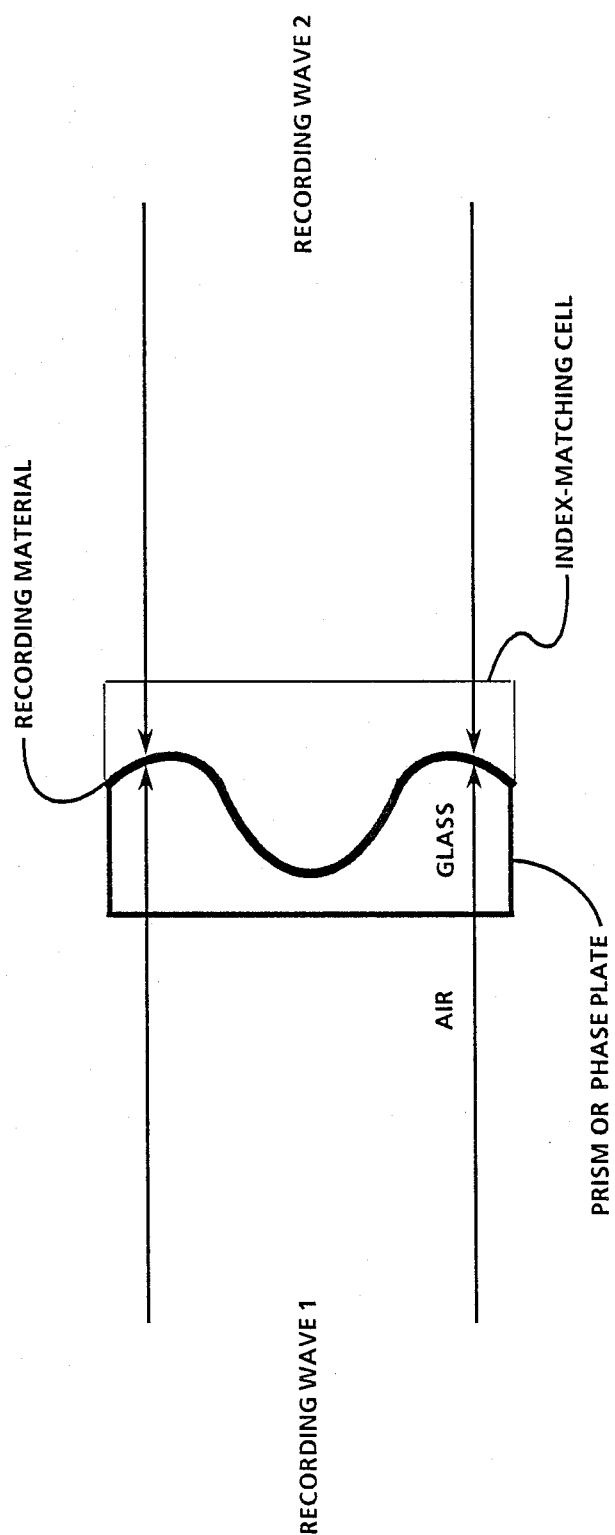
Figure 13A:
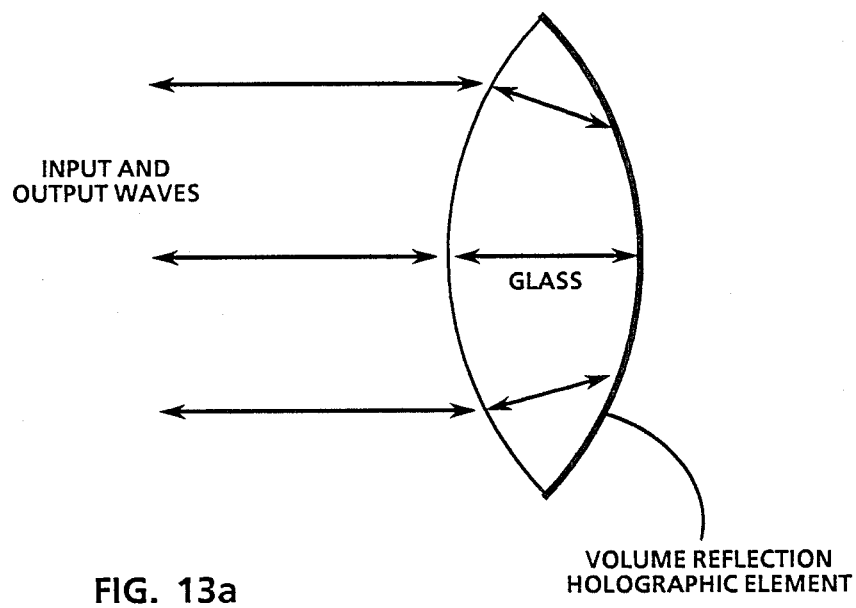
Figure 13B:
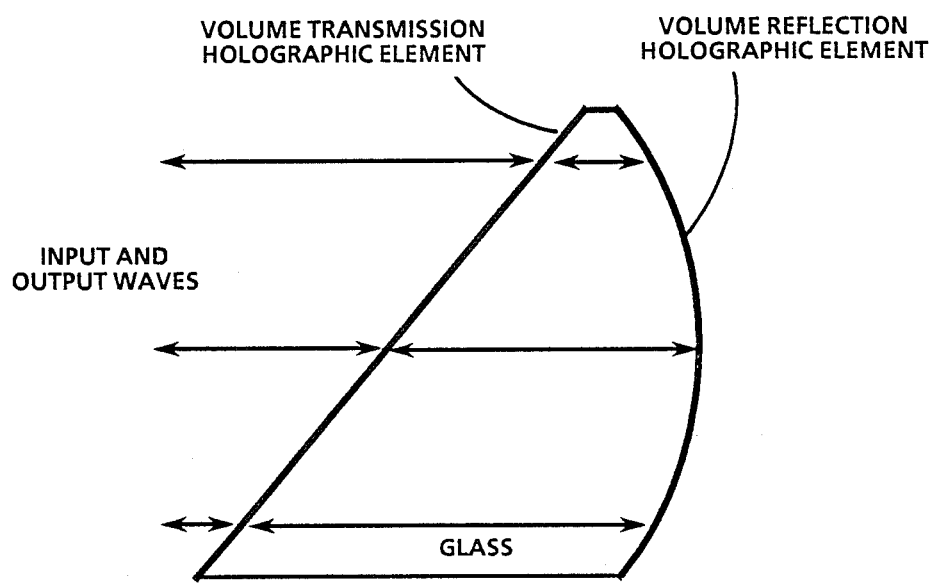
Figure 14:
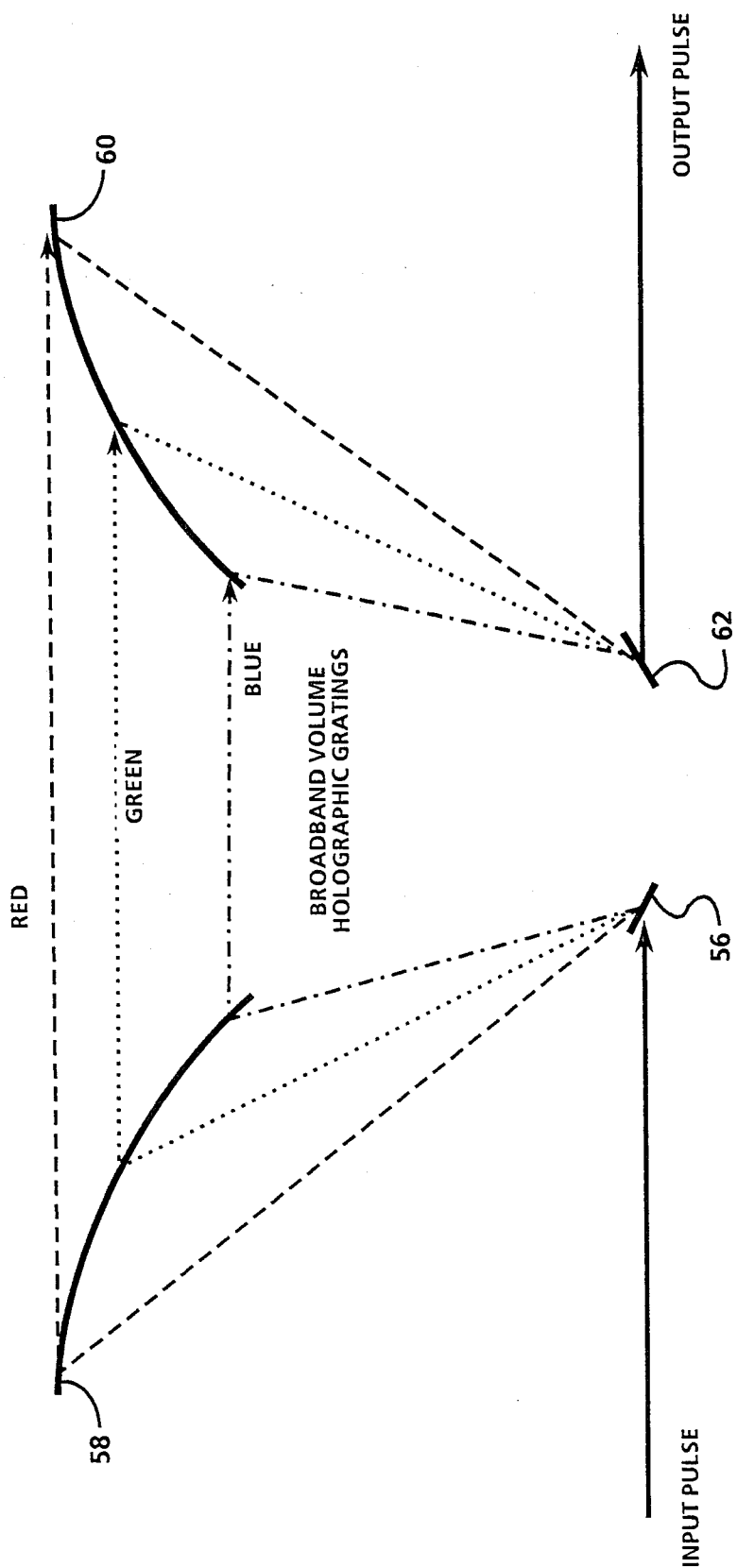
Figure 15:
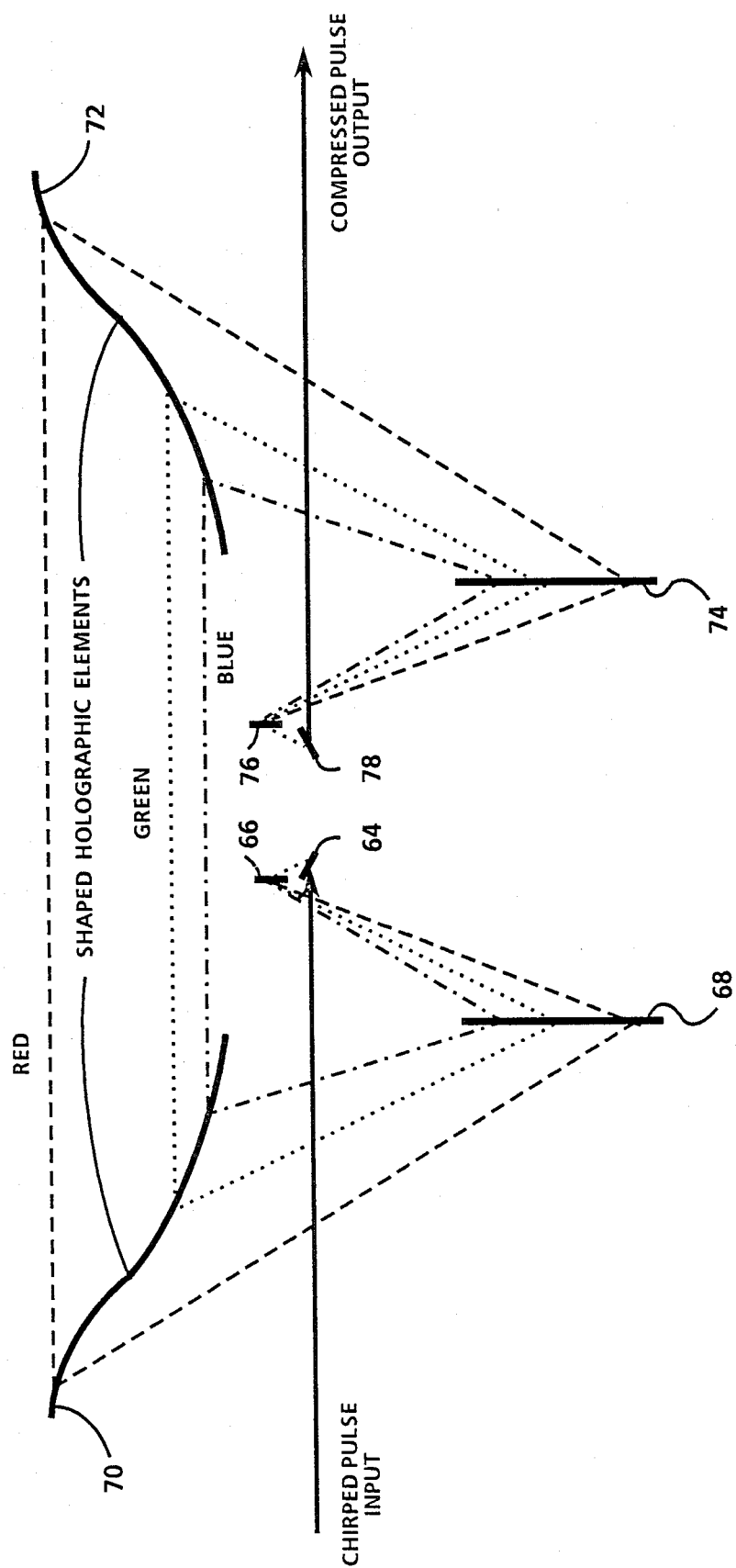
Figure 16B:
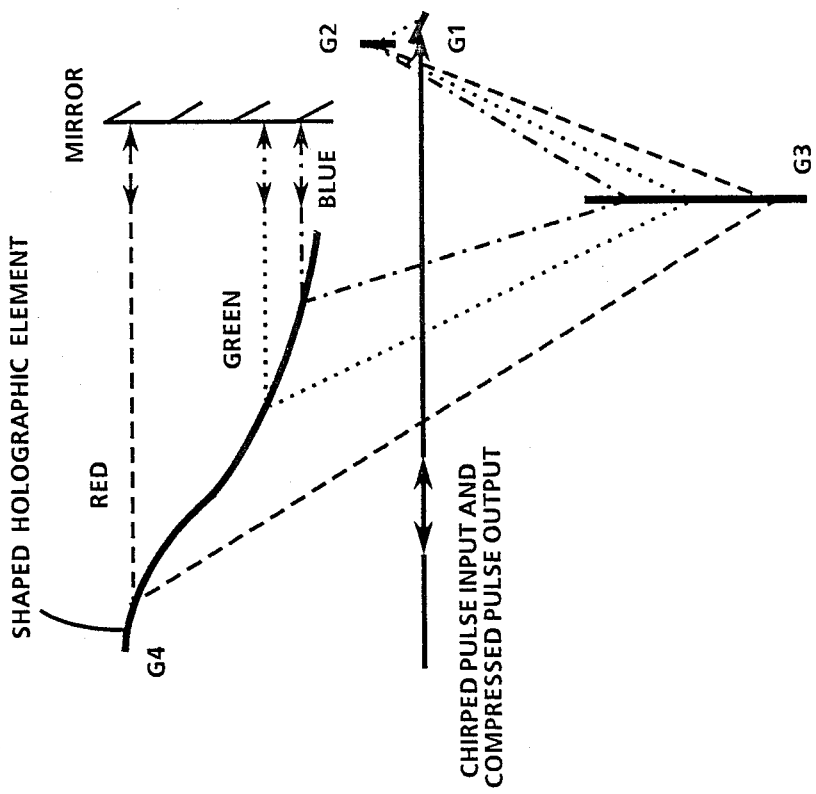
Figure 16A:
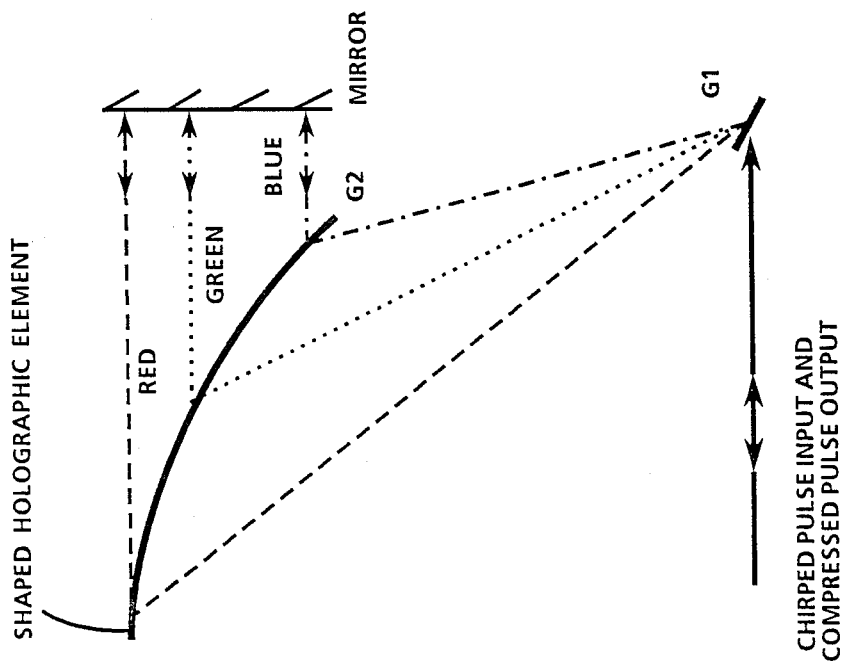
Figure 17:
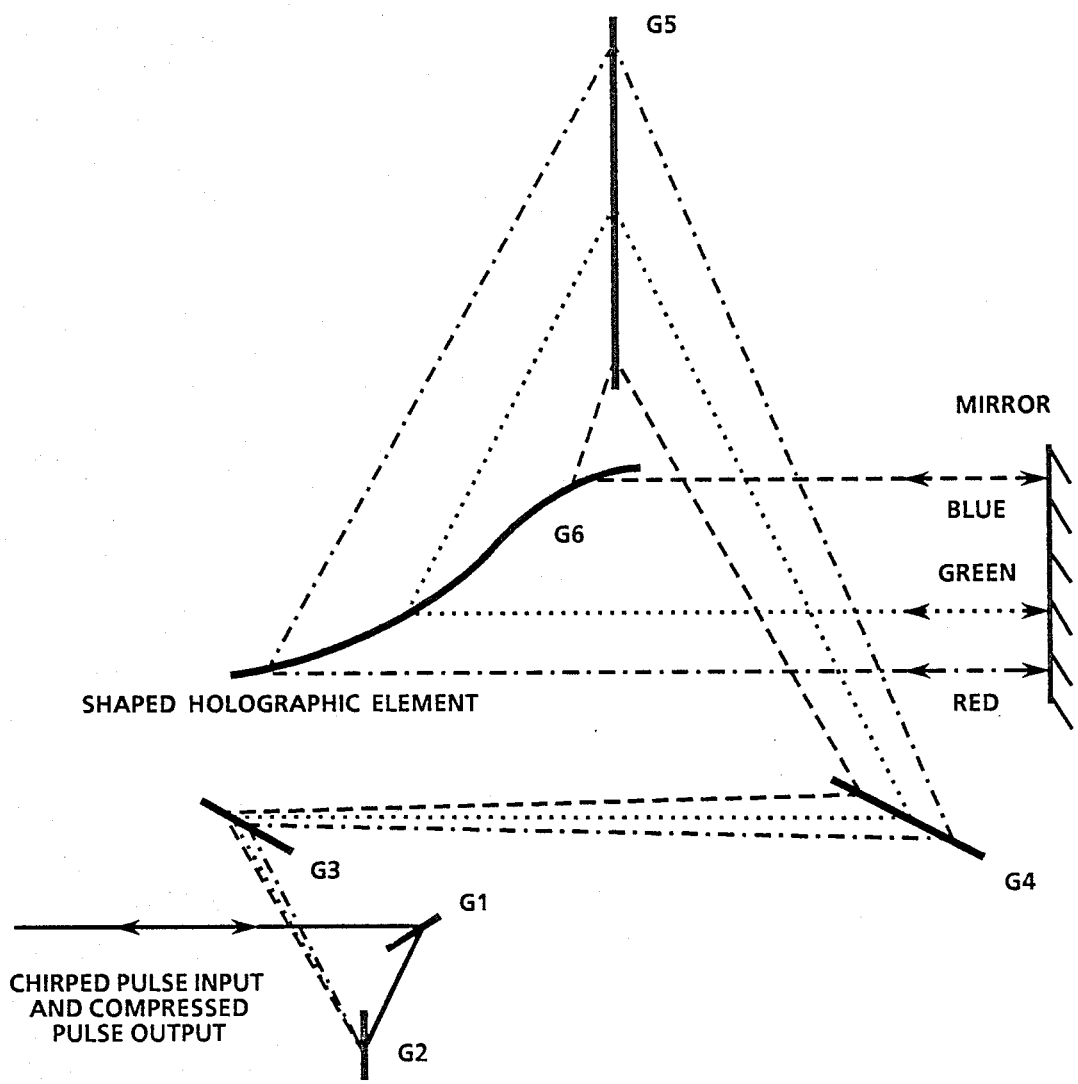
Figure 18:
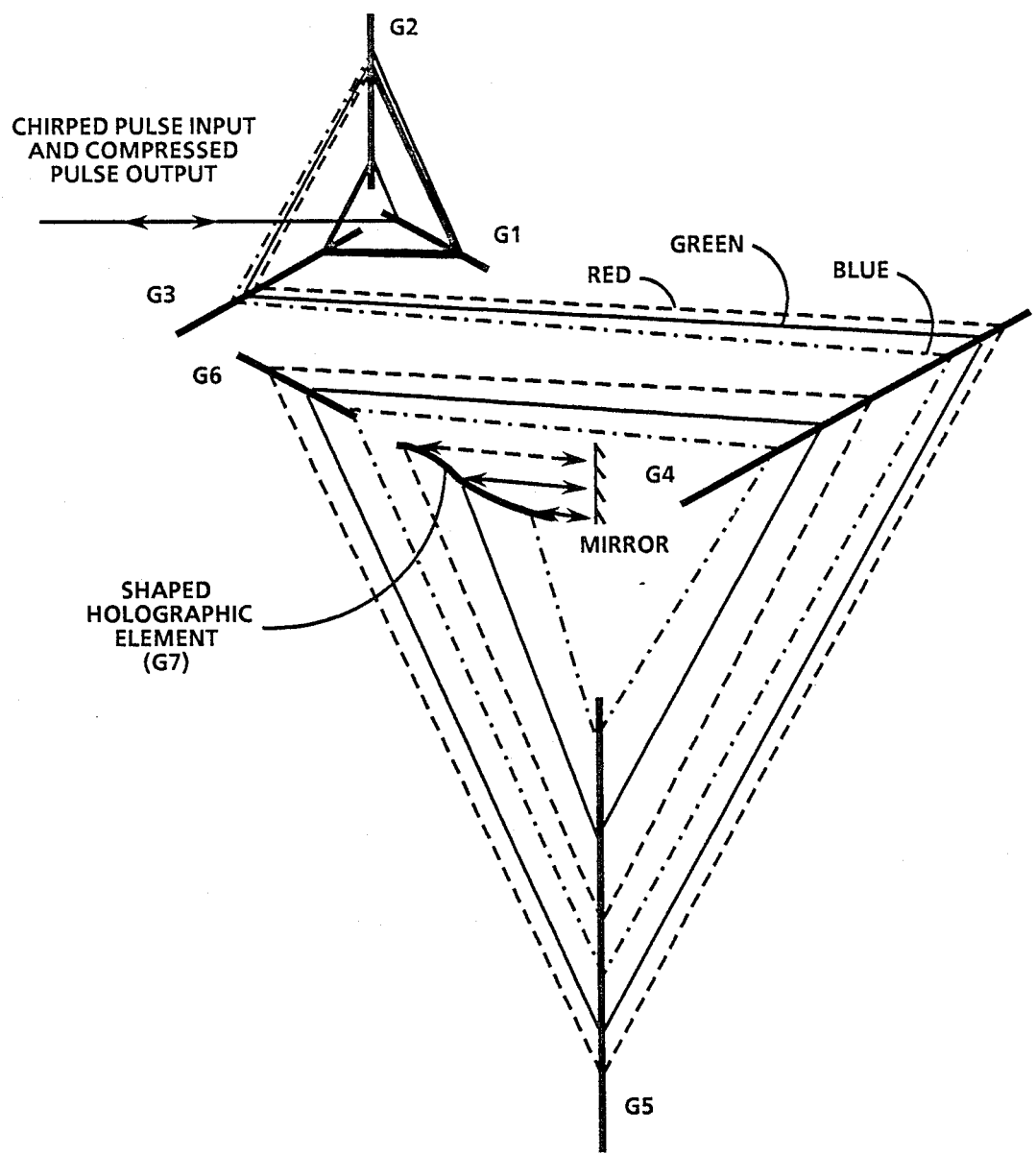
Figure 19:
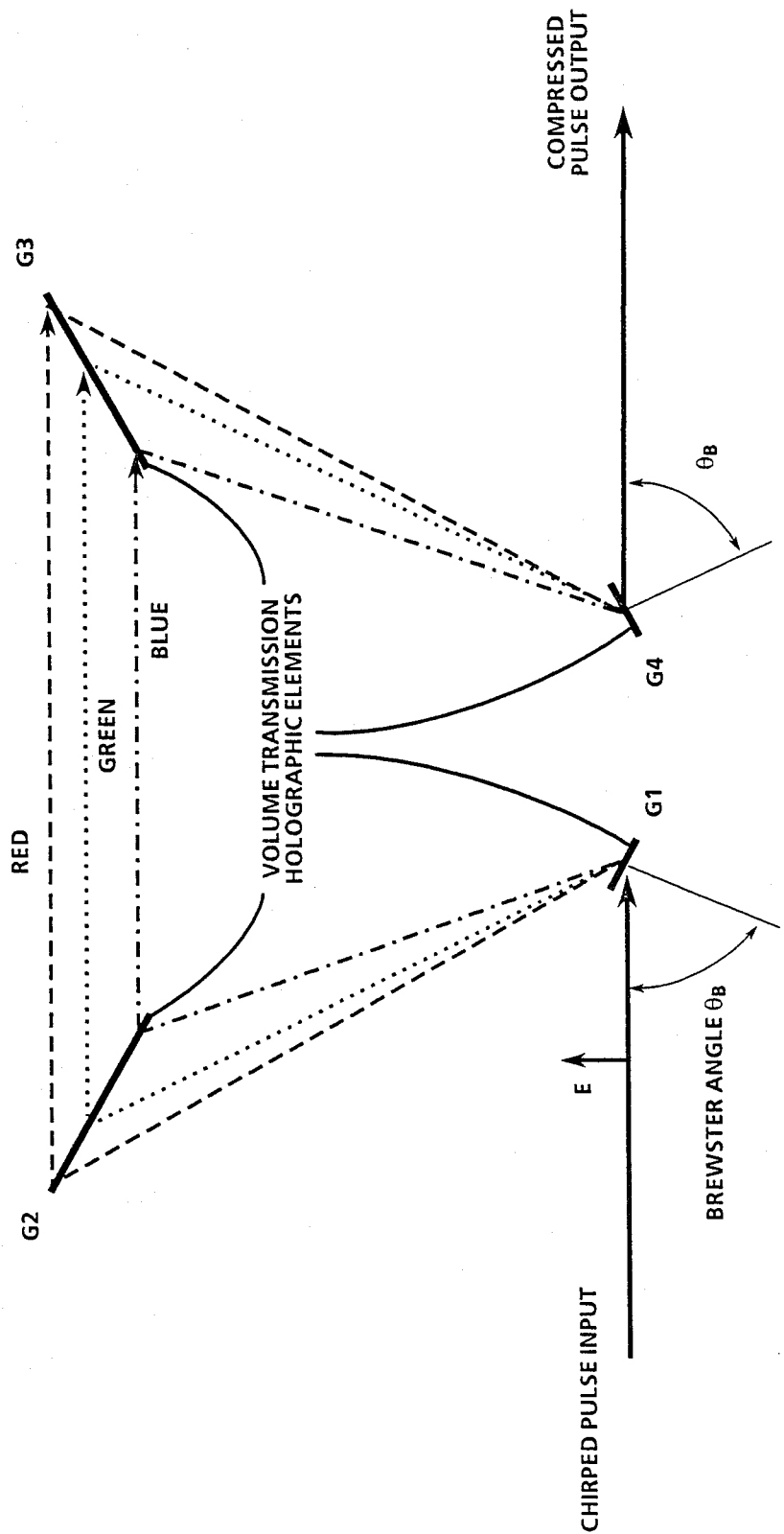
Figure 20:
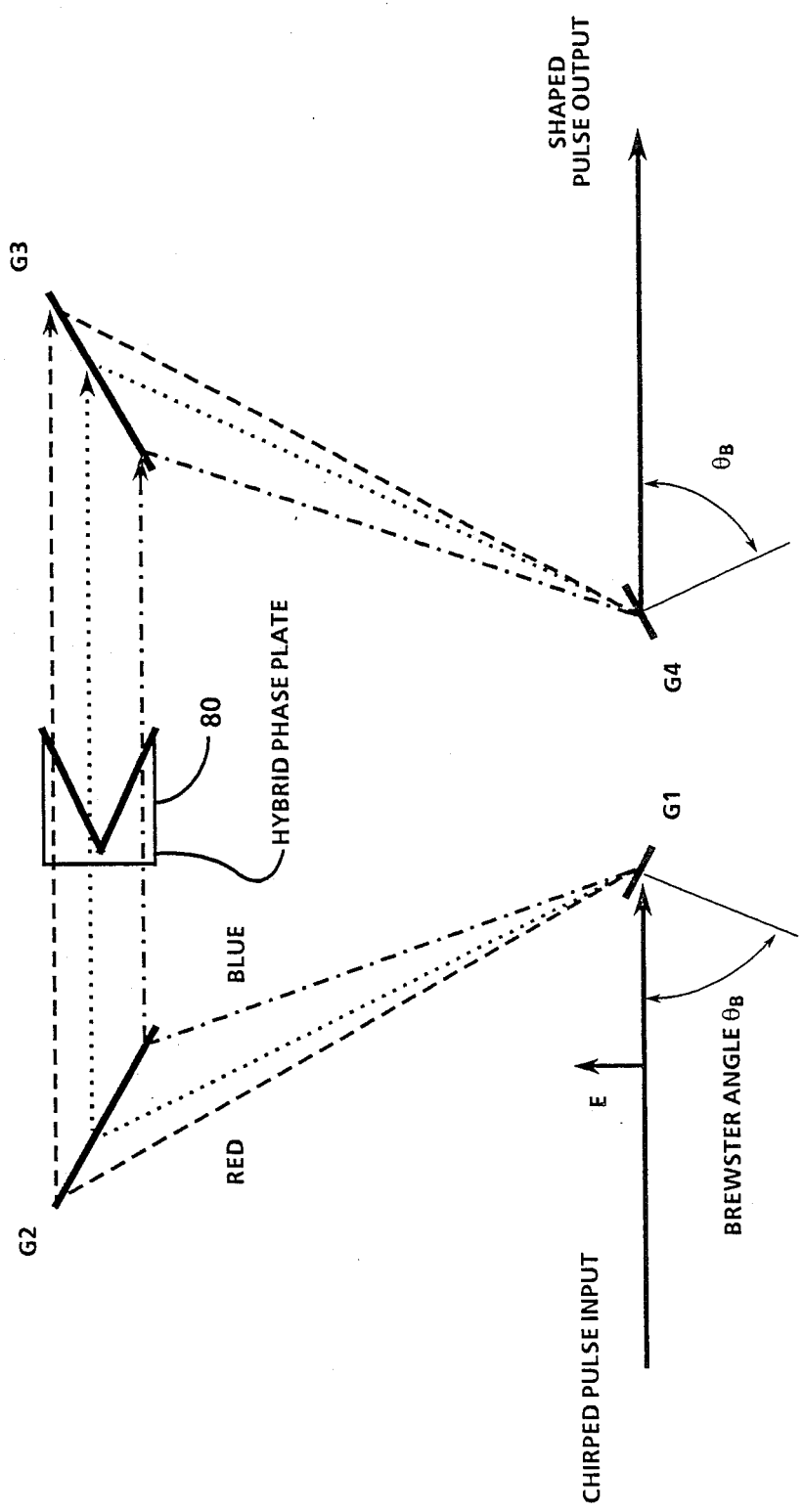
Figure 21:
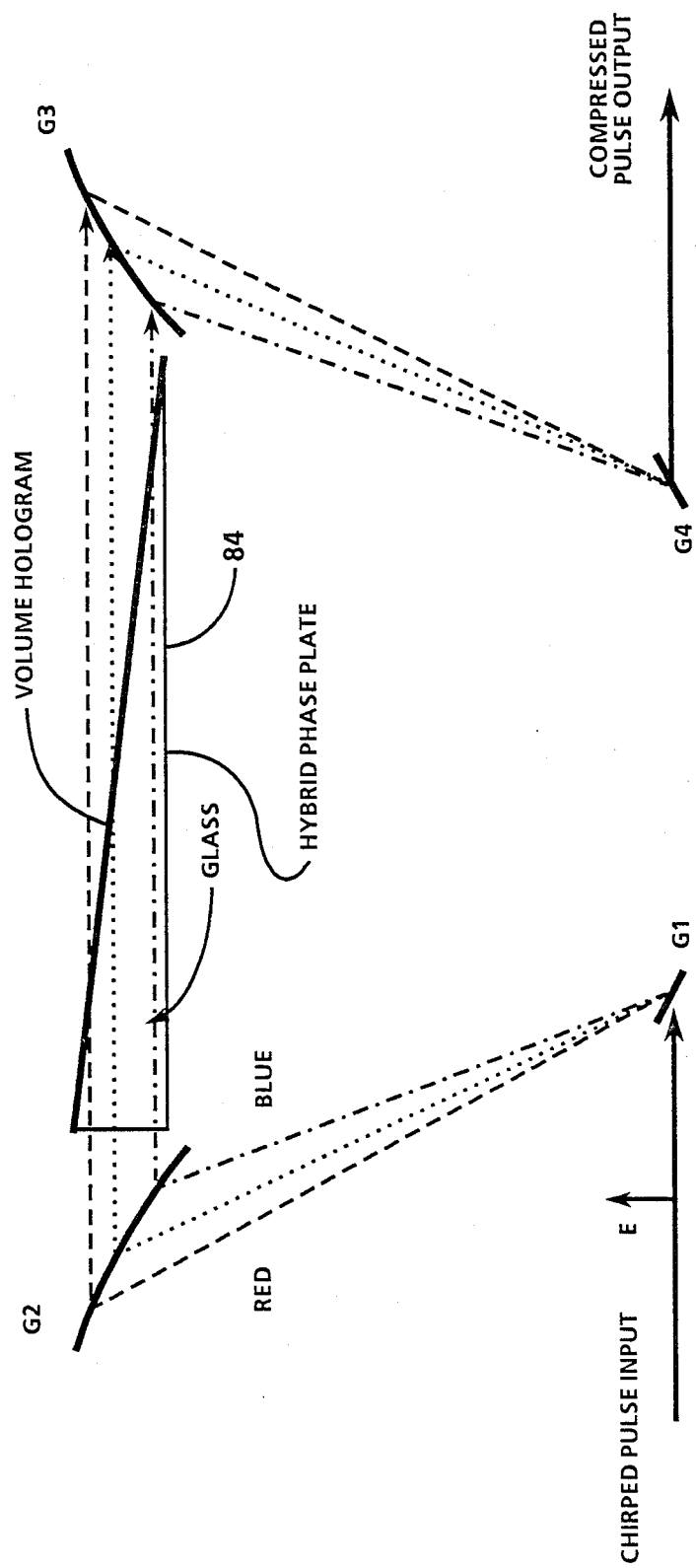
Figure 22:
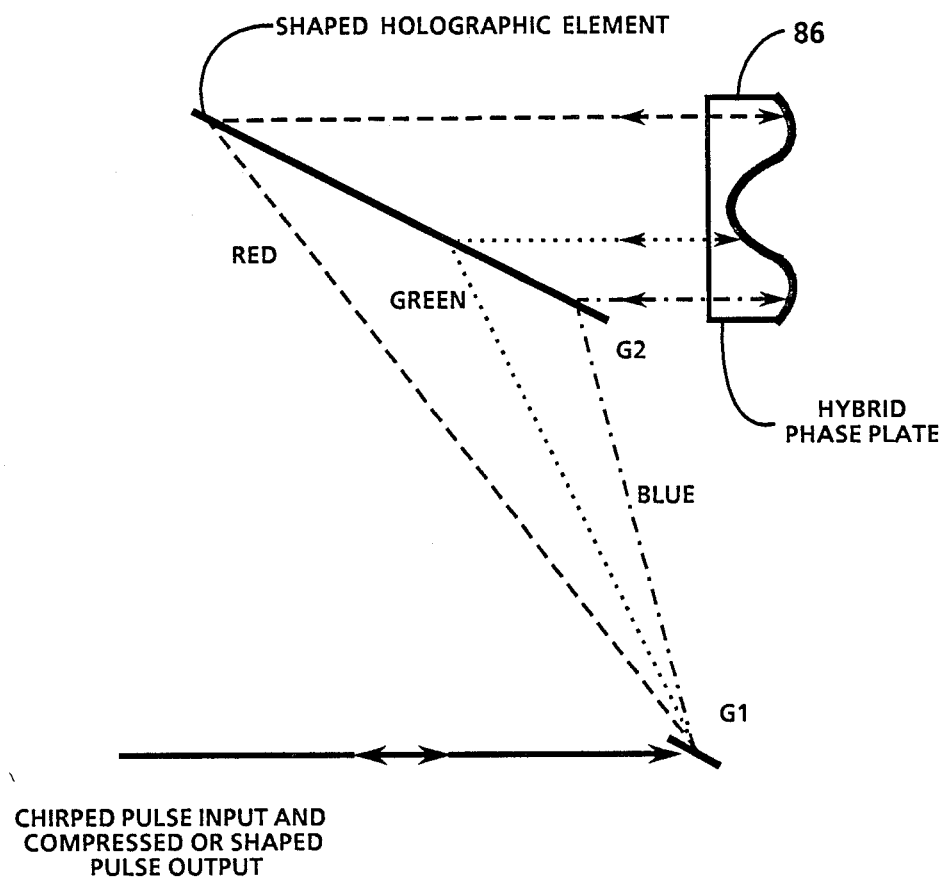
Figure 23:
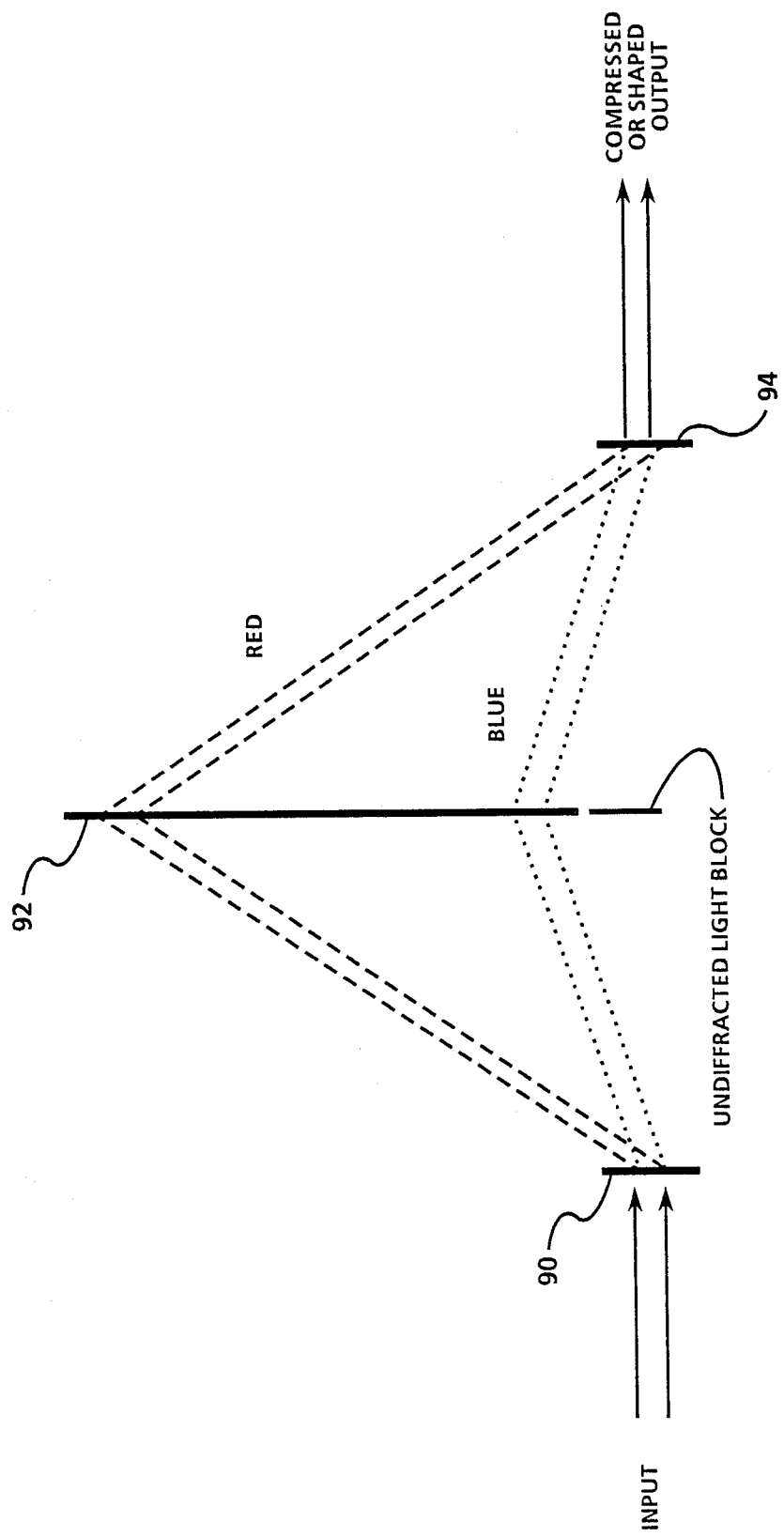
Figure 24:
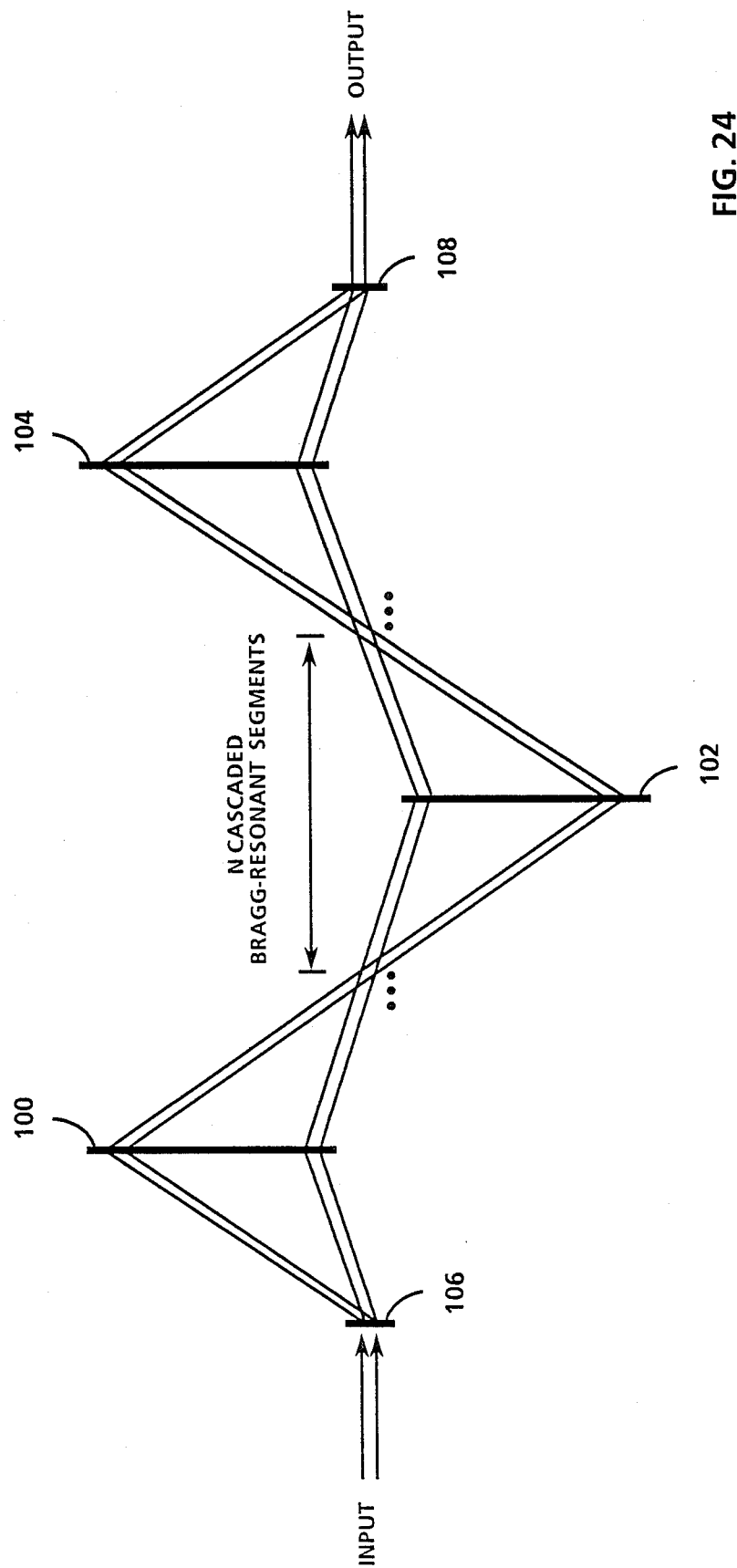
Figure 25:
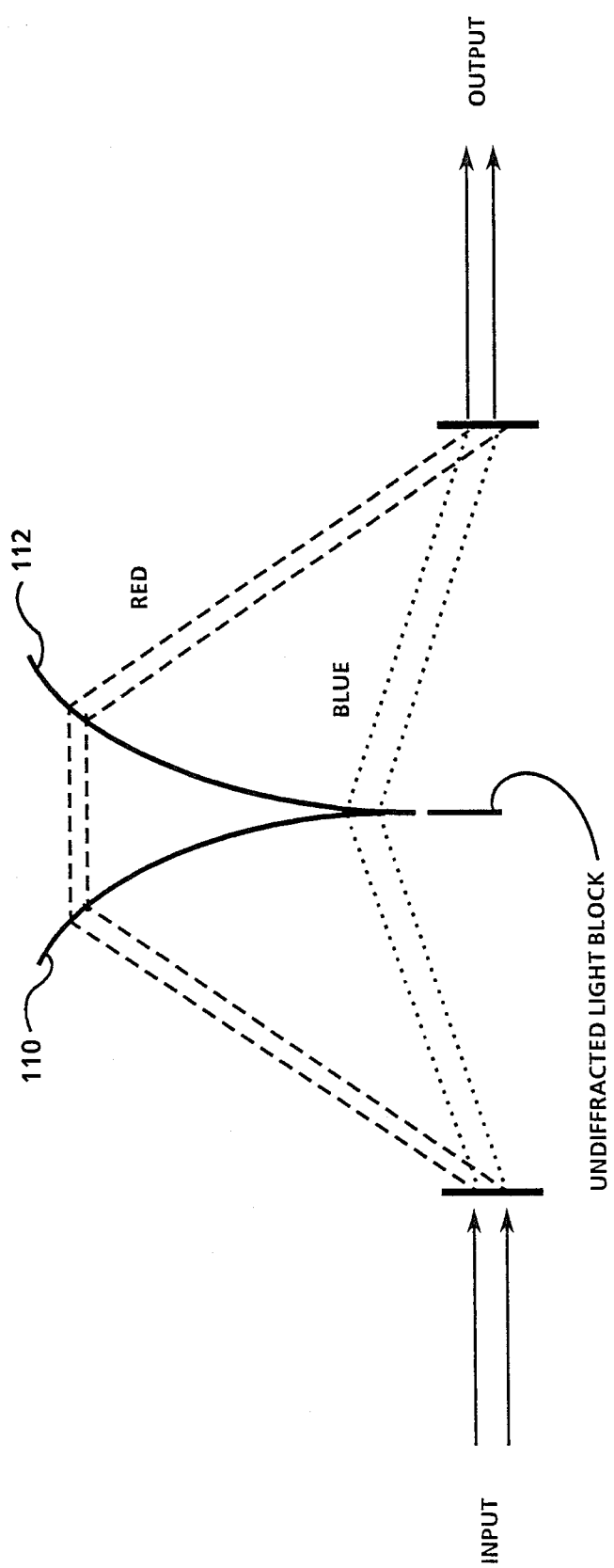
Figure 26:
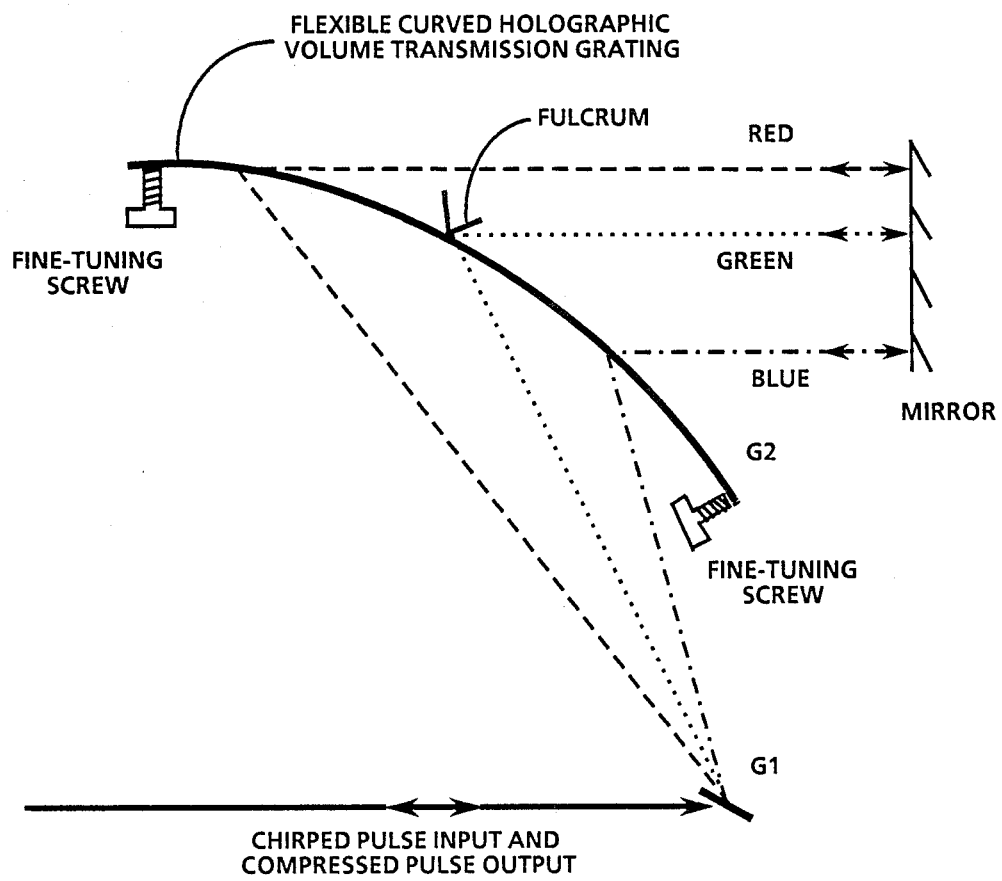
Figure 27A:
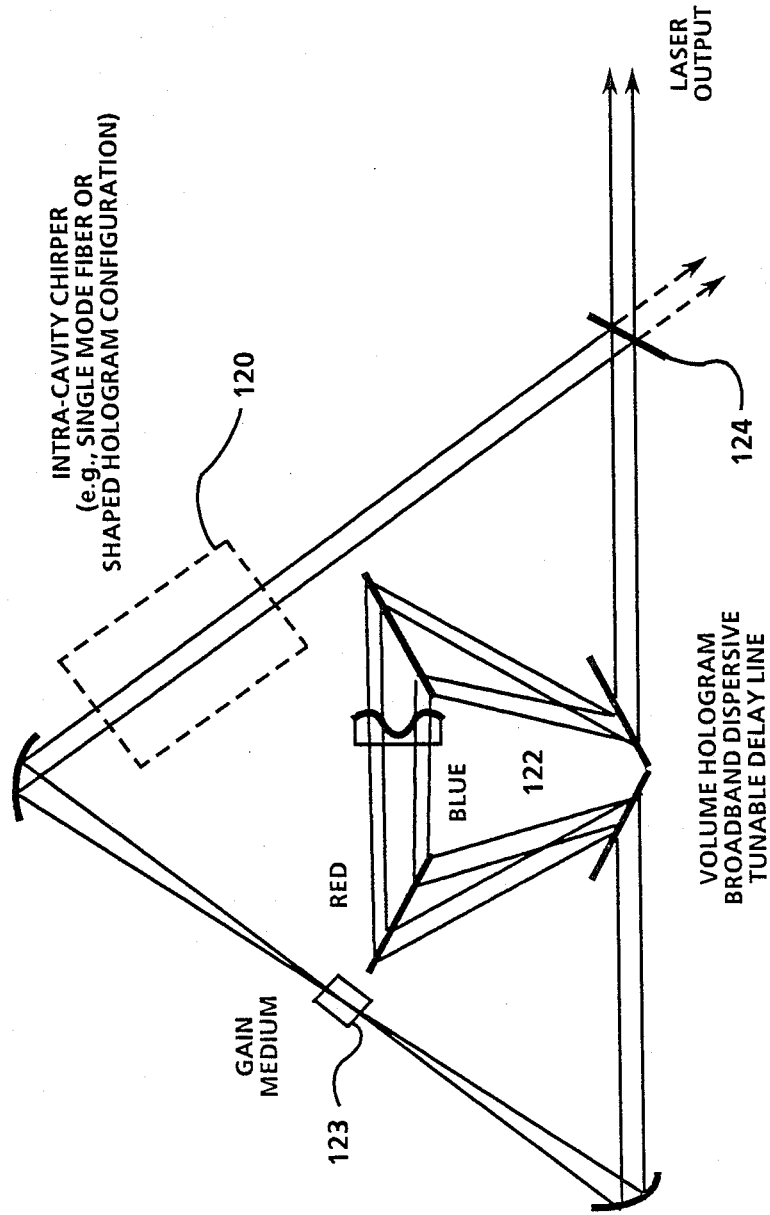
Figure 27B:
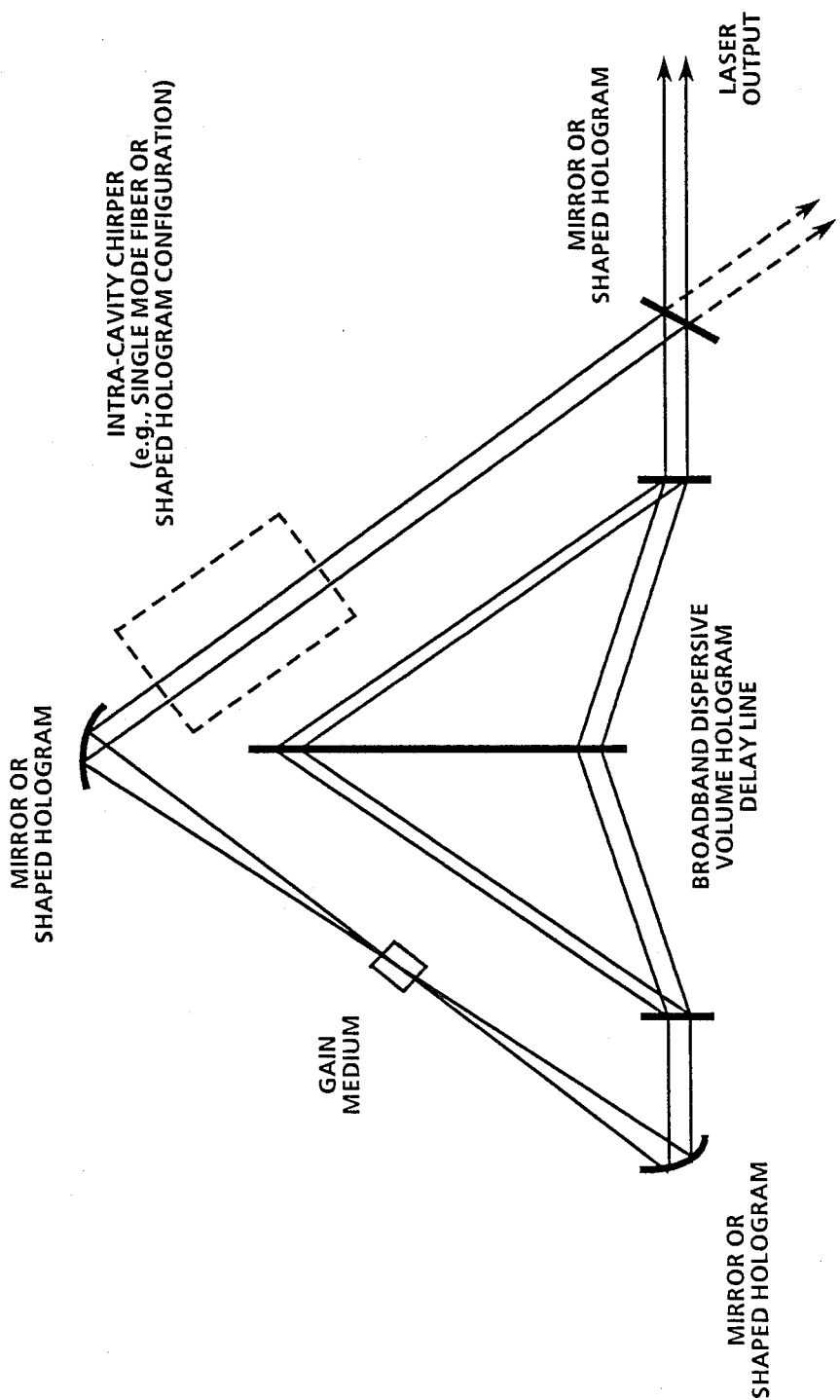
Figure 28A:
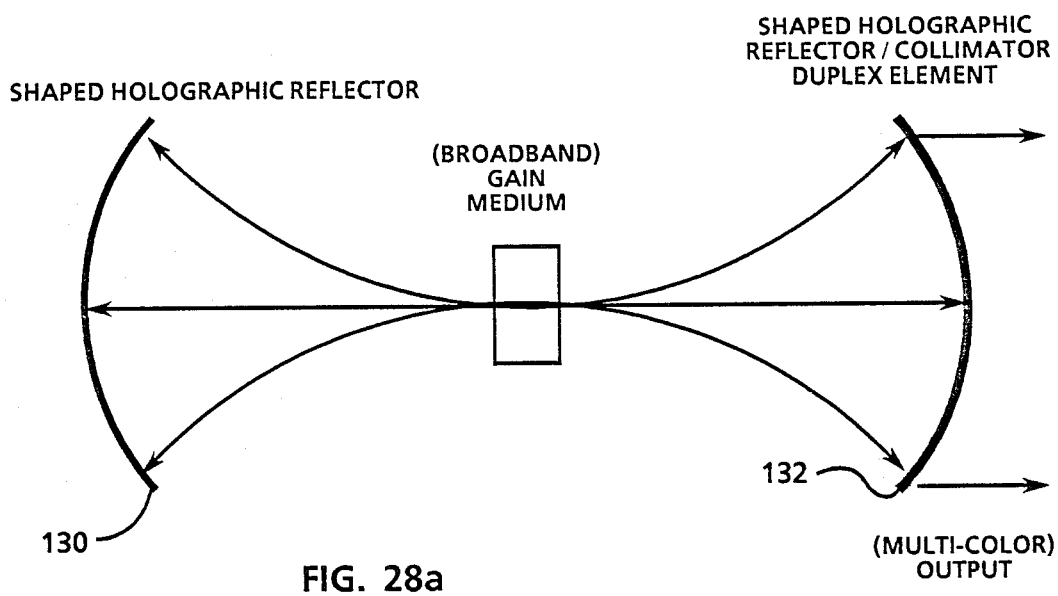
Figure 28B:
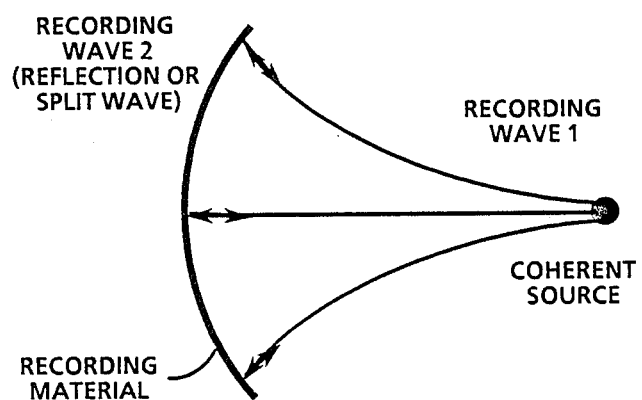
Figure 29A:
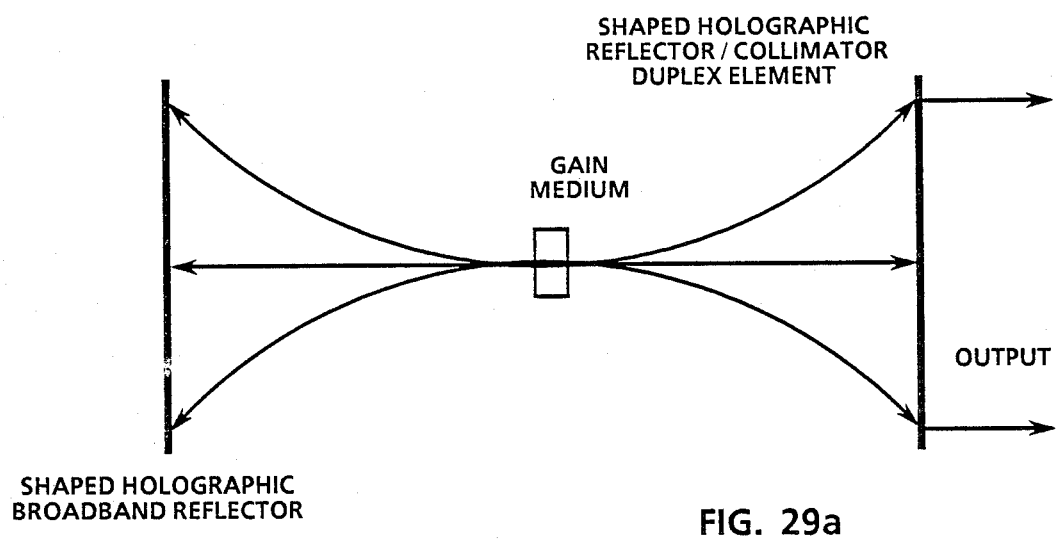
Figure 29B:
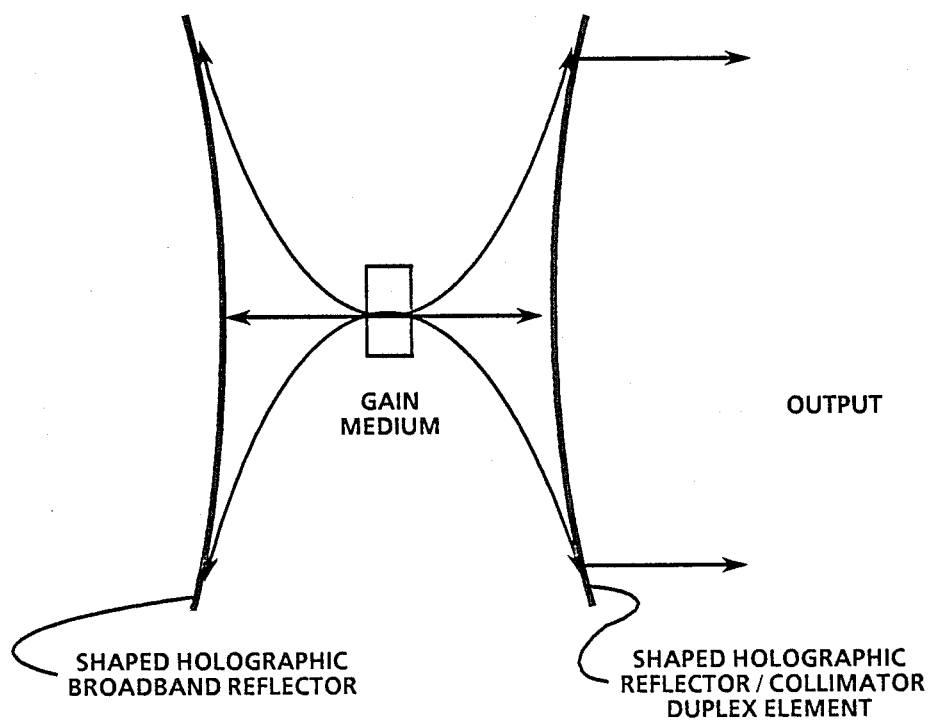

FIGS. 5a and 5a' show volume reflection holographic elements having different fringe patterns and showing that the spatial relationship of the incident and diffracted wave can be identical notwithstanding differences in the fringe patterns in the element;

FIG. 5b shows a curved volume reflection holographic element having a fringe pattern similar to that in the flat element of FIG. 5a;

FIGS. 6a and 6b show how the flat and curved elements of FIGS. 5a and 5b can be fabricated;

FIG. 7 shows schematically a programmable transmission spatially varying delay line using three curved volume holographic transmission elements;

FIG. 8 shows schematically a reflective programmable spatial varying delay line using four curved volume holographic reflection elements;

FIG. 9a shows a hybrid holographic transmission diffraction element and prism which provide a spatial delay line;

FIG. 9b and FIG. 9b' show the fabrication or recording of the hybrid prism holographic element shown in FIG. 9a, FIG. 9b' being an enlarged portion of the element;

FIG. 10a and FIG. 10b show other embodiments of hybrid prism spatially varying delay lines;

FIG. 11 and FIGS. 11' and 11" show a hybrid programmable prism/phase plate utilizing a reflective volume holographic element; FIG. 11' and 11" schematically illustrating narrow band and broad band fringe structures which may be used in the reflective (multi-layer) holographic element, respectively;

FIG. 12 is a diagram schematically illustrating how the hybrid phase plate of FIG. 11, with the fringe structure of FIG. 11', can be fabricated;

FIGS. 13a and 13b show other embodiments of hybrid programmable phase plates using refractive elements and reflective holographic diffraction elements;

FIG. 14 schematically illustrates a programmable chirped pulse compressor;

FIG. 15 schematically illustrates a high dispersion programmable chirped pulse compressor in accordance with another embodiment of the invention;

FIGS. 16a and 16b show double pass chirped pulse compressors in accordance with different embodiments of the invention;

FIG. 17 shows another programmable chirped pulse compressor having very high dispersion, in accordance with the invention;

FIG. 18 shows still another programmable chirped pulse compressor in accordance with the invention;

FIG. 19 shows a high efficiency chirped pulse compressor similar to the compressor shown in FIG. 14 but using high efficiency planar gratings;

FIG. 20 shows a chirped pulse compressor similar to that shown in FIG. 19 which also utilizes a hybrid phase plate including a prism and a volume transmission holographic grating;

FIG. 21 shows a pulse compressor similar to that of FIG. 14 utilizing a hybrid prism volume hologram phase plate for compressing pulses with a negative chirp;

FIG. 22 shows a programmable delay line using a hybrid phase plate and a transmission holographic element which provides a compressed or shaped output pulse;

FIG. 23 shows a Bragg resonant broad band delay line using a cascade of volume transmission holographic elements;

FIG. 24 shows another embodiment of a Bragg resonant cascaded broad band delay line;

FIG. 25 shows still another embodiment of a delay line using cascaded holographic elements arranged in a triangular configuration with curved elements constituting the vertex of the triangle;

FIG. 26 shows a compressor similar to that shown in FIG. 16a having a tunable volume transmission grating;

FIGS. 27a and 27b show laser resonators using delay lines similar to those shown in FIGS. 11 and 20 in the case of FIG. 27a and FIG. 23 in the case of FIG. 27b;

FIGS. 28a and 28b show a volume hologram laser resonator using curved holographic reflector elements and the fabrication of such elements, respectively;

FIGS. 29a and 29b show other laser resonators in accordance with the invention; and FIGS. 30a, 30b, 30c, 31a, 31b and 32 show still other laser resonators in accordance with the invention.

Figure 1A:
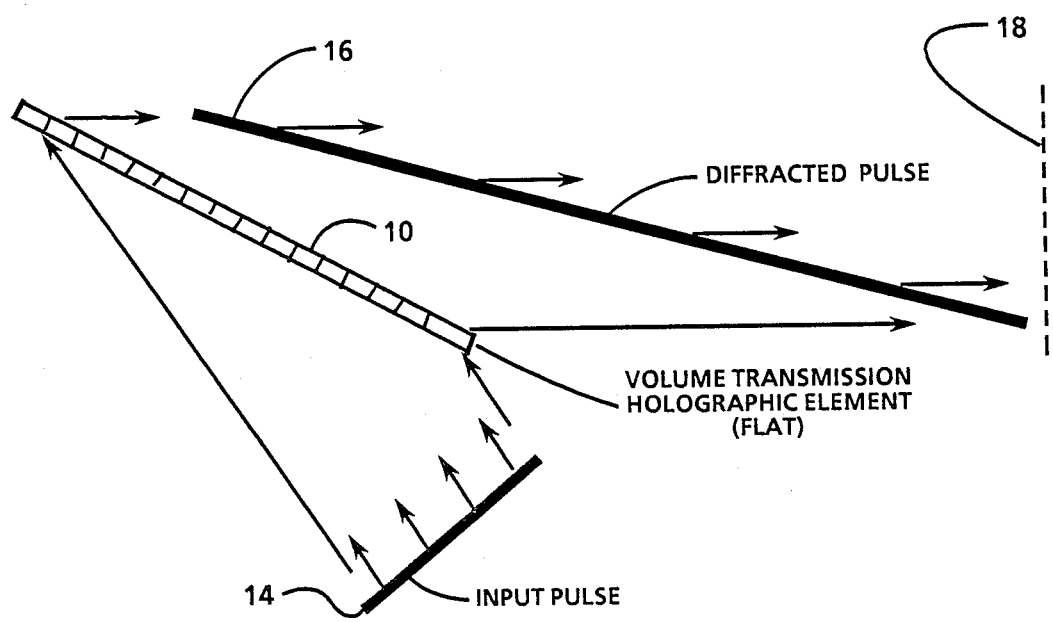
FIG. 1a and FIG. 1b show transmission holographic programmable spatial delay lines using a flat volume transmission holographic element and a curved volume transmission holographic element, respectively.

The programmable spatially-varying holographic delay illustrated in FIGS. 1a and b consists of shaped volume transmission holographic optical elements 10 and 12. The input short pulse shown at 14 is incident on the flat transmission volume grating 10 of FIG. 1a and is diffracted into the slanted pulse, shown at 16 which, in addition to being angularly dispersed according to its spectral bandwidth, is greatly extended in time upon arrival at the output plane 18. This temporal extension is due to the large spread in path lengths across the aperture of the pulse, with the lower edge of the incident pulse experiencing a longer optical path than the upper edge. When a short pulse is incident on the two holographic elements 10 and 12, as shown in FIGS. 1a and b, the diffracted waves differ significantly. Curves introduced into the holographic element 12 are mapped into spatially varying temporal delays in the diffracted pulse. This property is used to advantage, for example, in the chirped-pulse compressor of FIG. 14 and other FIGS. discussed hereinafter.

Figure 1B:
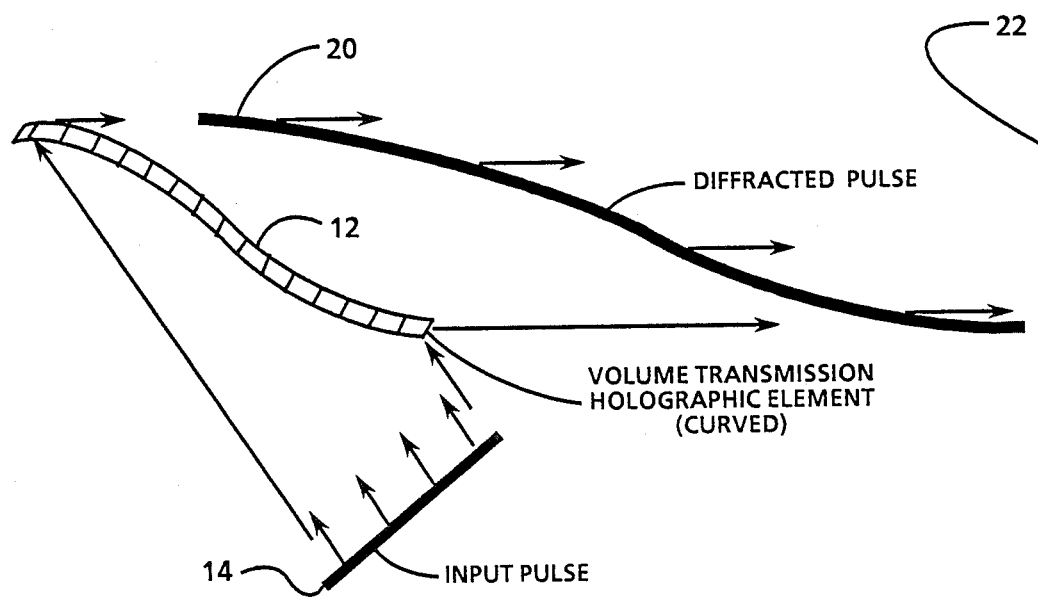

Although the performance of the flat grating 10 is useful, the path length (or time delay) variation it imposes is of a well-defined but severely limited form which is determined by the bandwidth of the pulse, grating period, and incident angle. For small frequency variations, the delay is approximately linear. However in many applications, e.g., when trying to compress an ideal linearly chirped pulse, residual nonlinearities impose an operational limitation. This limitation may be eliminated by utilizing the volume holographic element 12 fabricated on curved substrates as illustrated in FIG. 1b, which also diffracts the pulse, which is slanted as shown at 20, to an output plane 22. The element curvature provides the degree of freedom required to tailor the temporal dispersion properties of the device or compressor for a linearly chirped pulse. Additionally this degree of freedom may be used to extend the application of the delay line or compressor to input pulses which are not linearly chirped, but which have a more complicated or nonlinear temporal distribution of frequencies. In these cases, the shape of the curved holographic elements may be chosen to compensate for such nonlinear input chirps and thus achieve high compression ratios, as discussed earlier.

Figure 2A:
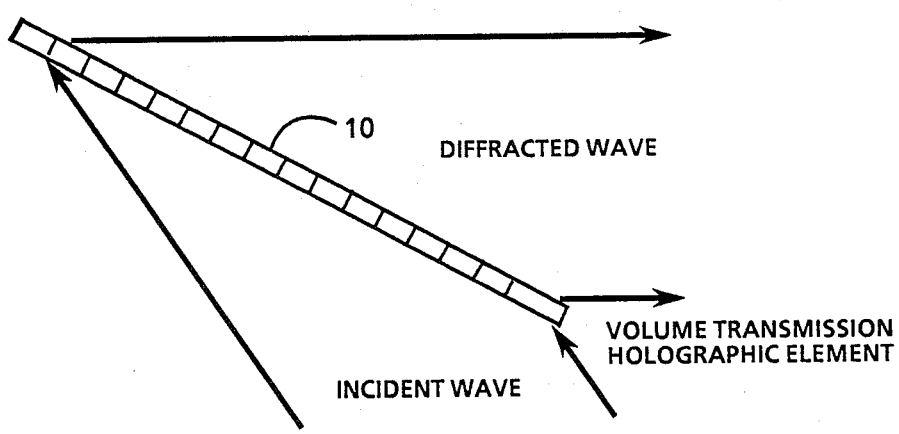
FIGS. 2a and 2b show the continuous-wave response of the programmable spatial delay lines of FIG. 1 using flat and curved elements respectively.
Figure 2B:
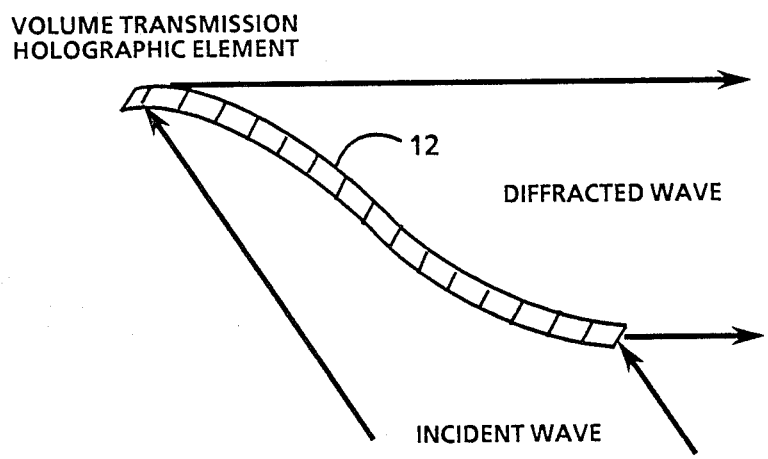
Figure 3A:
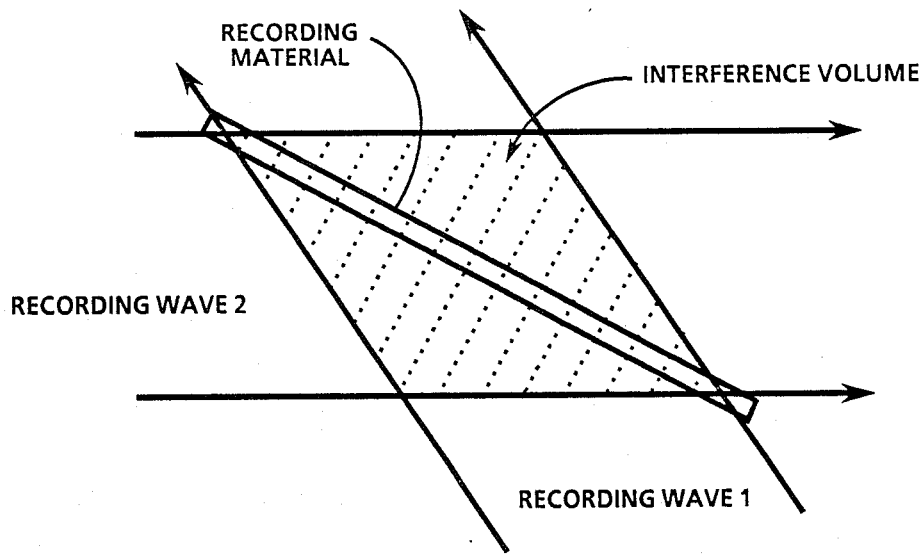
FIGS. 3a and 3b show how the flat and curved holographic elements which may consist of recording material coated on flat and curved transparent substrates are fabricated.
Figure 3B:
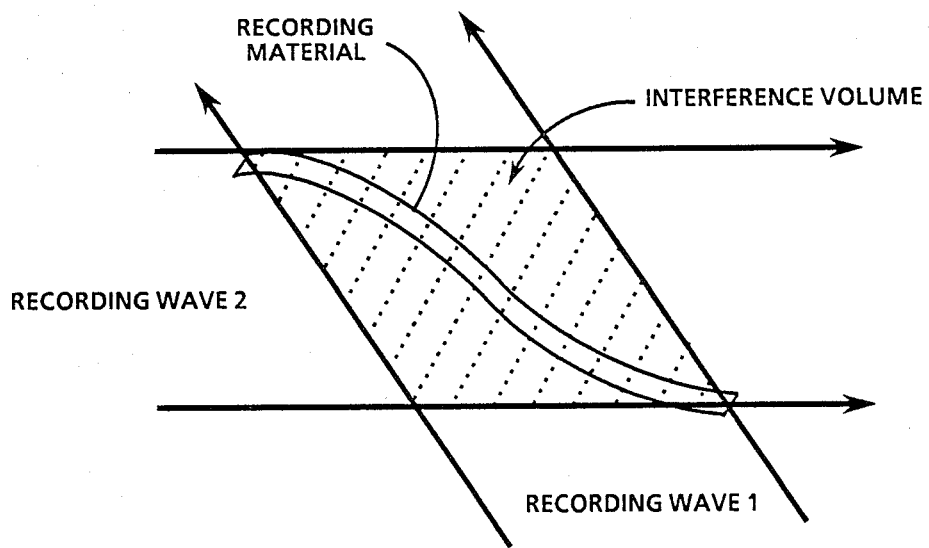

The continuous-wave properties and fabrication technique of the curved substrate holographic elements are shown in FIGS. 2a and b and 3a and b. FIGS. 2a and b illustrate that both the flat and curved holographic elements 10 and 12 diffract a continuous-wave input in a similar manner. The holographic elements are fabricated using the basic principles of off-axis holography as described in E. N. Leith and J. Upatnieks, "Reconstructed Wavefronts and Communication Theory," J. Opt. Soc. Am. 52, 1123 (1962), and applied to grating fabrication as described in N. George and J. W. Matthews, "Holographic Diffraction Gratings," Applied Physics Letters 9, 212 (1966). In the recording process, two coherent waves are caused to overlap forming an interference volume as shown in FIGS. 3a and b. Throughout this volume the stationary interference pattern spatially modulates the electric field, typically forming a three-dimensional sinusoidal distribution. A suitable recording material (e.g., dichromated gelatin, silver bromide emulsion, photopolymer, or the like) may be coated on a flat substrate as illustrated in FIG. 3a or on a curved substrate as illustrated in FIG. 3b. In each case the holographic fringe structure recorded is derived from a subset of the identical volume interference pattern. Therefore when the two exposed recording materials are processed into holographic elements, they both diffract an incident wave similar to the recording wave 1 into a wave similar to recording wave 2, as is illustrated in FIGS. 2a and b. As discussed above, however, the response to pulse which have varying frequency and spatial characteristics of the FIG. 1a and FIG. 1b gratings varies dramatically.

Figure 4B:
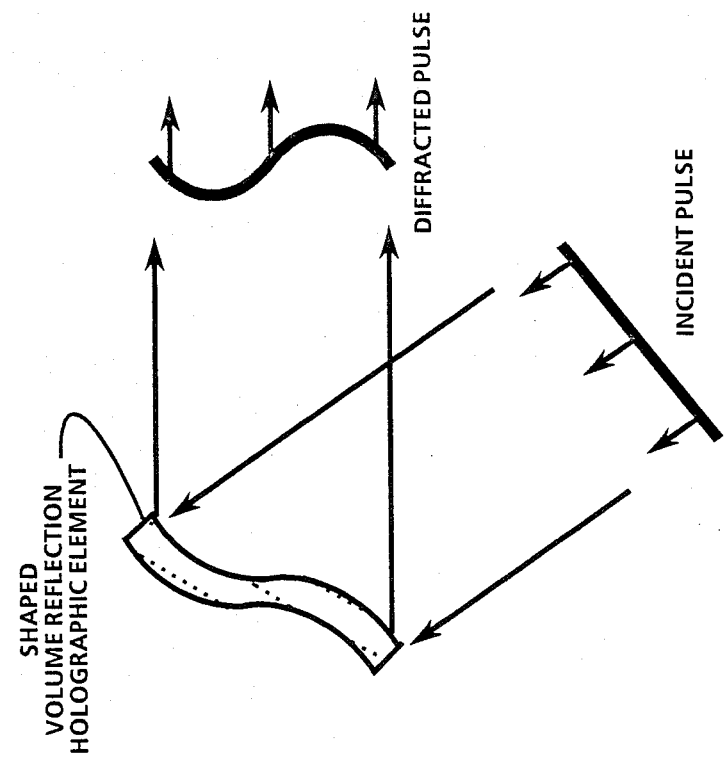
FIGS. 4a and 4b show volume reflection holographic programmable spatial delay lines using flat and curved elements, respectively.
Figure 4A:
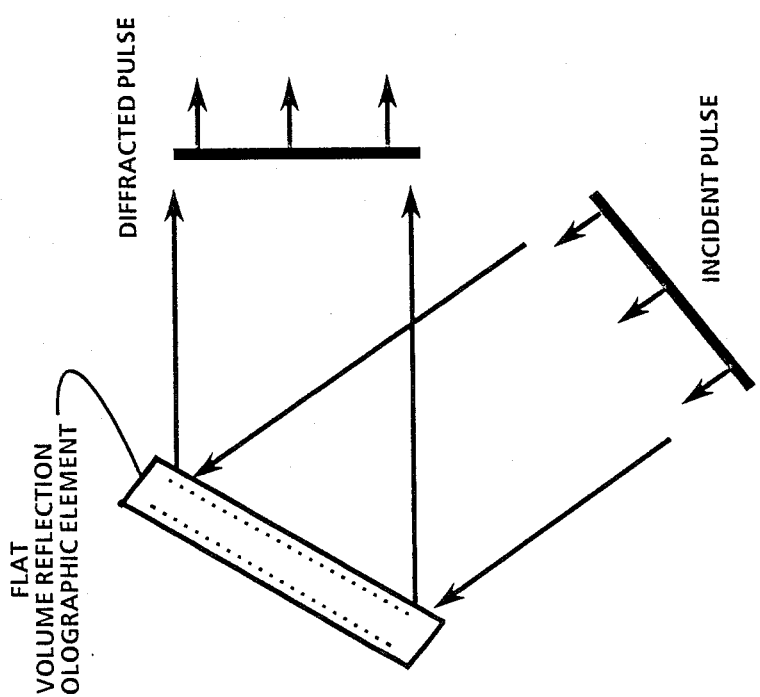

A second type of spatially dependent programmable delay line is formed using reflection volume holographic optical elements 26 and 28, as is illustrated in FIGS. 4a and b. In this device an incident pulse is reflected by the hologram in a direction independent of the surface shape of the element, but rather dependent on the holographic fringe structure distributed throughout the volume of the element. The continuous wave response of the same elements is illustrated in FIG. 5. Although the flat element in FIG. 5a resembles a mirror in function, it is very different as illustrated in FIG. 5a' where a related element is inclined at a large angle and still diffracts the same incident wave through an identical angle. As in the transmission delay line case, the spatially varying delay function of the elements is strongly coupled to the element shape. By choice of the gross inclination of the element as well as its fine shape, the spatial delay imparted to an incident pulse may be a function essentially superimposed on the input pulse (as in FIG. 4b) or the spatial delay may have a pronounced ramp component as would result from the element in the FIG. 5a insert. As with the curved volume transmission holographic elements, the volume reflection elements are readily fabricated using the technique illustrated in FIGS. 6a and b.

An important feature of the reflection elements is the vast bandwidth variability which may be achieved by controlling the volume fringe structure. Since faithful reproduction of the sinusoidal interference pattern can be maintained in the recording process, the reflection holographic elements may be fabricated to exhibit extremely narrow spectral bandwidths, e.g., spectral bandwidths in the range of from fractions of an Angstrom to hundreds of Angstroms over the visible light band. However, by causing a chirp in the depth-profile of the spatial period, extremely broad bandwidths may be achieved—essentially forming a white light mirror. These depth period-chirps are often readily obtained by controlling recording process parameters. As an example the volume reflection grating exposed as illustrated in FIG. 6a may be processed to exhibit high reflectivities over thousands of Angstroms by processing the material so as to cause a shrinkage proportional to emulsion depth; thus introducing a chirp to the holographic fringe structure. This same broad-bandwidth performance may be obtained in the more complicated curved elements using related techniques. In strongly curved regions it may be useful to expose the recording material by spatially scanning two recording beams in unison while varying them (or the recording material) in angle to produce the desired local fringe plane orientation. Further discussion of these properties appears hereinafter.

It is important to distinguish the volume diffracting element obtained in the latter procedures from conventional ruled, blazed, or holographically exposed and then etched "surface" gratings. The volume holographic elements consist of a distribution of refractive index, scatterer density, or other wave-affecting parameter throughout the volume of the element to constitute the fringe pattern, and may exhibit diffraction efficiencies on the order of unity (100%). Additionally this volume distribution is approximately independent of the shape of the surface layers bounding the emulsion (with the exception of refraction that may occur there), and thus with curved elements of this type the spatial period along the surface of the elements may vary greatly across the element aperture. The term "holographic grating" and "holographic element" are used synonymously here. The curved volume holographic structures are of a more complicated basic structure than conventional periodic "gratings."

Programmable transmission spatially varying delay lines may be formed by cascading the individual elements discussed previously, as is illustrated in FIG. 7. Here three elements 30, 32 and 34 are used to diffract the center wavelength of the incident pulse through 360°; thus causing it to exit parallel to the incident pulse direction. The inner path is much shorter than the outer path forming a "ramp" spatial delay across the pulse, and the curves in the elements may be chosen to tailor the spatial delay function modulated on top of the large ramp delay function. A roof prism (not shown) may be used to retro-reflect the exiting pulse back through the delay line shown, recollimating the spectral components of the pulse and eliminating the dominant ramp delay function. Thus the curves imparted to the elements may be used to impress residual spatially-varying delays on the exiting wavefront.

An analogous delay line using reflective volume holographic elements is illustrated in FIG. 8. Here four shaped reflective elements 36, 38, 40 and 42 form a spatially varying delay line in which the outer ray path is much shorter than the inner path. Again element curvatures are used to impart programmable spatially-varying temporal delays in the incident pulse. A feature of this delay line is the variability in spectral and angular bandwidth which may be imparted by the fringe pattern of the volume holographic element structure. If the holographic elements are fabricated to be narrow-band, spectral processing may be performed on the incident pulse in order to shape its spectrum. Alternatively, a chirp may be introduced along the depth of the holographic volume structure causing a broad-band response. In this latter case ultra-short optical pulses with correspondingly broad spectral profiles may be shaped without excessive angular dispersion introduced into the spectral components.

Still another class of spatially-varying temporal delay lines may be formed using hybrid phase plates, hybrid prisms, and hybrid lenses as illustrated in FIGS. 9–13. These devices consist of a cascade of a conventional refractive or dispersive elements (as, for example, constructed from glass) and holographic optical elements, and utilize both refraction and diffraction. The hybrid prism delay line illustrated in FIG. 9a, consists of a conventional right-angle prism 42 with a volume transmission hologram 44 recorded on its hypotenuse. In one application, the incoming pulse is normally incident on a prism face, and propagates into the prism with no change in direction. The holographic element on the hypotenuse diffracts the incident pulse through an angle such that the pulse refracts out of the hologram-air interface with an exiting direction parallel to the incident pulse direction. The net effect is a delayed pulse shown by the slanted plane 46 with a dominant spatially varying delay and a hybrid diffractive/refractive dispersion. Since the diffraction and refraction mechanisms have opposite effects (diffraction affects longer wavelengths more strongly and refraction typically affects shorter wavelengths more strongly), these processes may be balanced or mixed to achieve desired dispersions.

The fabrication of such a hybrid prism is illustrated in FIGS. 9b and 9b'. A normally incident recording wave 1 is caused to interfere with a plane wave 2 incident from the same side but which is inclined so that it forms an internal angle (in the prism) which would refract out of the prism in a collinear direction with the first recording wave. This interference pattern is recorded in the presence of a black, index-matched background material so as to eliminate any volume reflection (multilayer) elements from being recorded simultaneously.

This technique may be readily generalized to produce more complex hybrid prisms, as illustrated in FIGS. 10a and b. In addition to the pulsed-response applications of these devices, they are useful in continuous-wave application where the unique dispersion is sought independently of spatially varying temporal delays. In both application regimes, the elements may take on two- and three-dimensional variations, as in the case of hybrid lenses.

Another class of versatile hybrid prism, hybrid lens, or hybrid phase plate is formed using reflection volume holographic elements as illustrated in FIGS. 11, 11' and 11". In these hybrid phase plates, an incoming pulse is transmitted normally through an air/glass interface, and is incident on a shaped volume holographic reflection grating 50. This volume grating reflects the pulse which then propagates out of the hybrid phase plate via the glass/air interface. Thus the primary effect of this phase plate is to introduce a spatially variable phase delay in the incident beam without affecting the beam propagation direction. Again the bandwidth of the holographic element is a free parameter chosen by the profile of the hologram structure. The narrowband local fringe structure illustrated in FIG. 11' is highly periodic, while the broad-band version (FIG. 11") has a chirp of spatial period throughout the depth of the element. These devices are also readily fabricated, for example as illustrated in FIG. 12, where a recording material is coated on the curved surface and exposed to two coherent counter-propagating plane waves. The second plane wave may be derived from the first by surface reflection (or vice versa), and an index-matching cell may be used to prevent refraction-induced recording beam angle changes. In this recording process and those previously discussed, the recording material is shown coated on the curved surface for simplicity, and in many cases may be separated by small distances so long as surface reflections and total internal reflection is avoided.

More complicated spatially-varying phase delays may be introduced with hybrid phase plate or hybrid lens configurations as illustrated in FIGS. 13a and b. Additionally the complete cancellation of lens power illustrated in the previous examples need not be maintained.

FIGS. 14-26 show other optical systems according to the invention; specifically frequency dependent delay lines, chirped pulse compressors, pulse chirpers, and polychromatic delay lines. In these devices as with those discussed above, desired spatio-temporal characteristics are programmed into the device by selecting appropriate holographic element curvature. The spatially-varying delay lines discussed previously may be transformed into spectrally-varying delay lines by inserting them in dispersive systems as discussed in greater detail below.

One such programmable chirped pulse compressor consisting of four gratings 56, 58, 60 and 62 is illustrated in FIG. 14. An input pulse is incident with a positive "chirp" or frequency dependence across the temporal pulse profile. A positive chirp is taken to mean the frequencies along the leading edge of the pulse are "red-shifted" or of a longer wavelength than those at the trailing parts of the pulse. This incident pulse is first incident on the grating 56 which angularly spreads the spectral components of the pulse. This first grating 56 is preferably a volume transmission grating due to the extremely high diffraction efficiencies available, but may be replaced by conventional ruled or holographic reflective blazed gratings. This first grating 56 spatially disperses the chirped pulse so that the longer wavelengths (red) are on the upper edge and the shorter wavelengths (blue) lie on the lower edge of the pulse as incident on the second (curved) grating.

Once the spectral components are sufficiently spread by the first diffraction as shown, the pulse is then incident on the second grating 58 which is a volume transmission holographic grating which lies along a curved locus (cylindrical in space with no curvature along the dimension perpendicular to the plane of the figure). Light waves containing the different frequency components of the input pulse strike this second grating 58 at different places. The spatial period (along a direction parallel to the surface of the first element 56) across the entire second grating 58 is the same as that of the first, so that all components emerge parallel to the input pulse propagation direction. Thus with a curved grating (e.g., curving the substrate), different path lengths (and hence time delays) can be prescribed for each such component.

After diffracting through the second grating 58, the frequency components of the input pulse are both: (1) temporally dispersed due to the different path lengths traversed; and (2) spatially dispersed with the longer wavelength rays shown on the top side of the beam and traveling parallel to the shorter wavelength rays on the bottom side. This highly dispersed pulse is then incident on the second pair of gratings 60 and 62, which are shown in this case to be a mirror image of the first pair 56 and 58. Since the pulse's frequency components are still spatially dispersed, the third grating 60 is curved to further extend the magnitude and range of dispersive delays achievable with this device. The spatial frequencies of the second grating pair are identical to those of the first pair causing the pulse component frequencies to be spatially recombined. Thus the output pulse exiting the programmable compressor is spatially similar to the input pulse. In the output pulse, each of the frequency components of the pulse have been shifted by a prescribed amount controlled by the curvature of the elements 58 and 60. In this case the red rays which lead the input chirped pulse have a longer distance to propagate than the blue, and the pulse temporally collapses. Further, each of the four gratings may be oriented near Brewster's angle, thus providing for a nearly lossless transmission of a P-polarized input pulse.

The chirped pulse compressor of FIG. 14 may be used in an optical fiber pulse compression and detection system. The input pulses arrive from an optical fiber and are collimated, for example, by a gradient index rod lens or other suitable lens. The chirped pulse from the fiber is compressed in the four grating compressor shown in FIG. 14. The final grating 62' may be a volume holographic off-axis lens which both spatially recombines and brings to a focus the compressed pulse. This concentrated exiting light pulse may then be incident from a suitable photo-detector.

FIG. 15 shows multiple gratings 64, 66 and 68 which are cascaded for the initial dispersion step, and which provides increased spatial dispersion at the curved element 70, and thus greater delay function flexibility. A mirror image combination of four gratings 72, 74, 76 and 78 is used for the recombination into a compressed output pulse. The sets of four volume transmission holographic gratings, cascaded for spatial dispersion (left half) and recombination (right half), greatly increase the angular dispersion of the different wavelength components of the pulse. In each of these four-grating sets, the first two gratings 64, 66 and 72, 74 act to introduce angular dispersion to the various frequency components, while the second two gratings 68, 70 and 76, 78 "undo" this angular dispersion. Thus, the collimated input of each four-grating half is maximally divergent after two of the diffractions and again collimated after the fourth. When it is desired to obtain a maximum spatial separation of the pulse frequency components in between the two stages (the usual case), it is therefore most efficient to increase the separation between the middle two gratings of each half (i.e., between 66 and 68 and correspondingly between 72 and 74) to achieve the desired displacement.

This device is particularly useful where the frequency chirp on the input pulse is of limited magnitude. In such a case the bandwidth of the pulse is also limited, resulting in nearly perfect diffraction efficiency at each of the holographic gratings, thereby allowing many volume holographic gratings (four as shown or more) to be cascaded without significant loss in overall diffraction efficiency. Further the choice of incident angle may be made to match Brewster's angle for the holographic grating interface which will nearly eliminate surface reflection losses.

The ability to efficiently increase dispersion is useful because it leads to a larger lateral displacement of the various pulse frequency components at the curved holographic elements 70 and 72. This increased lateral displacement allows larger element curvatures while maintaining the curved hologram approximately flat over each of the component frequencies; resulting in essentially constant temporal delay for each of the component frequencies, which is usually desired. This advantage may be stated in a slightly different way in that the higher dispersion front end resulting from the cascade of high efficiency holographic gratings will allow an input beam of larger lateral extent (and hence lower diffraction spreading) to be incident to the compressor.

The pulse compressors of FIGS. 14 and 15 are shown with reflection symmetry about a vertical line through the center of the device. Complete spatial recombination of the separated frequency components created by the left "separating" side is achieved in the right "combining" side if the angular deviation diffracted in each side is of the same magnitude but opposite sense (clockwise and counterclockwise). Two retro-reflected double pass systems of this type are illustrated in FIGS. 16a and 16b, wherein the entire right half of the device may be replaced by a plane mirror, causing the spatially dispersed pulse to retro-reflect back through the left half of the system and exit correctly recombined. This exiting pulse may travel down the same path as the incident pulse, or slight deflections of the components (e.g., the retro-mirror) may be introduced to separate the input (chirped) and exiting (compressed) pulse. The double pass equivalent of the system described in FIG. 14 is illustrated in FIG. 16a, while the equivalent of the high dispersion compressor of FIG. 15 is shown in FIG. 16b.

In cases where the frequency spread in the incident pulse is small, additional gratings may be utilized in order to achieve the desired degree of dispersion and lateral displacement at the curved holographic elements. Since volume holographic gratings exhibit very high diffraction efficiencies, such grating cascading can be efficiently implemented.

An example of a programmable compressor of the retro-reflecting type having such increased dispersion is illustrated in FIG. 17. A cascade of planar gratings (G1-G5, and a curved grating G6 are used, although one or more of the latter plane gratings may also be shaped. Similar devices may be made with even greater dispersion by simultaneously adding two gratings at a time to the device shown; one in the lower clockwise diffraction cascade and one to compensate for it (i.e., eliminate the angular dispersion introduced by the previous addition) in the upper counterclockwise diffraction cascade.

Even further dispersion (ultra-dispersion) may be obtained as shown in FIG. 18, by extending the dimension of the gratings G1-G5, adding one additional grating G6 to the shaped (curved) grating G7, and spiraling as many times as required to achieve the desired angular dispersion. In this embodiment twelve cascaded diffractions are used to laterally disperse the pulse's frequency components (six for angular dispersion and six for recollimation) followed by a mirror reflection and the same twelve diffractions in reverse. The latter incoming diffractions (e.g., by the G6 and G7 gratings) may be performed utilizing curved holographic elements as discussed earlier enabling tailoring of the spectral delay characteristic of the device.

The chirped pulse compressor of FIG. 14 is useful also in the case where the holographic transmission gratings are all flat. This case (illustrated in FIG. 19) is characterized by high dispersion, compact size, and greater diffraction efficiency than is obtainable from ruled or holographic reflective blazed gratings and in addition by the alignment and efficiency advantages of utilizing Brewster's angle for the angles of incidence and diffraction and minimizing surface reflections as discussed earlier.

A hybrid phase plate 80 may be used in the high efficiency holographic chirped pulse compressor of FIG. 19 as shown in FIG. 20. The hybrid phase plate provides programmability in temporal delay function, or may be used to supplement variable delays introduced with curved grating elements (instead of flat gratings G2 and G3) as described in FIG. 14.

Utilization of hybrid phase plates allows sufficiently variable temporal delays to enable the use of the pulse compressors with negatively chirped pulses, i.e., in which the shorter wavelengths are leading in time the pulse. A compressor of this type is illustrated in FIG. 21, where a much larger delay is introduced to the blue rays than to the red rays by the hybrid prism volume hologram phase plate 84. For the case of broad-spectrum pulses, it may be desirable to sweep or taper the spatial period of the grating in the hybrid prism phase plate in order to eliminate any angular deviation introduced therein.

All of the spatially-varying delay line devices shown in FIGS. 1, 2, 4, 5, 7, 8, 9a, 10, 11 and 13 may be utilized in similar fashion to form frequency dependent delays. A further example of this is given in FIG. 22, where a reflection hybrid phase plate 86, as shown in FIG. 11, is used to provide delay-line programmability.

A different geometry which is useful as a broadband chirped pulse compressor or delay line is the triangle configuration, an example of which is illustrated in FIG. 23, and consists of three volume holographic elements 90, 92 and 94. The first 90 of two base gratings 90 and 94 acts to diffract and spatially disperse the incident pulse toward the vertex element 92. This vertex grating 92 has twice the spatial frequency of the two base gratings, and thus diffracts and spatially recombines the pulse's spectral components toward the final base grating, where the reconstituted pulse is rediffracted collinearly with the incident pulse. In this device red (or longer wavelength) light is diffracted through a larger angle than blue (or shorter wavelength) light by the two base elements, thus causing a much larger path length through the device. When the incident pulse consists of a broad spectral bandwidth, some loss of diffraction efficiency is suffered in each of the base elements. However the vertex element is maintained in a Bragg-Resonant condition (i.e., the diffracted angles sweep with a wavelength change in a manner which simultaneously satisfies the Bragg condition for high diffraction efficiency), and is therefore much more efficient over a broader spectral bandwidth. By properly trading-off element Bragg thickness and peak diffraction efficiency, high diffraction efficiencies may be obtained over visible bandwidths several thousand Angstroms broad. Details of this trade-off, the spectral diffraction efficiency performance of the triangle cascade, and detailed discussion of Bragg-resonant tuning and Bragg Thickness are discussed in T. Stone and N. George, "Bandwidth of Holographic Optical Elements," Opt. Lett. 7, 445 (1982); and T. Stone and N. George, "Wavelength Performance of Holographic Optical Elements," Appl. Opt. 24, 3797 (1985).

The Bragg-resonant feature of the vertex element 92 in the triangle configuration may be repeatedly utilized in the cascaded triangle configuration compressor/dispersive delay line illustrated in FIG. 24. Here three triangle configurations 100, 102 and 104 are cascaded by deleting the internal base gratings, resulting in a three-fold increase in the temporal dispersion while adding only Bragg-resonant vertex elements. There may be more, n, cascaded triangular stages. In the case n=3 as shown in FIG. 24, the first and last gratings 106 and 108 are subject to Bragg-detuning of efficiency, but the three internal vertex elements are all maintained Bragg-resonant and hence efficient over a broad spectral bandwidth. Thus, in practice n may be large with only small penalties in diffraction efficiency.

The basic triangle configuration may be made programmable by the addition of hybrid phase plates or by splitting the vertex element into a pair of curved elements which introduce the desired temporal delay distribution among the pulse's component frequencies. The latter case is illustrated in FIG. 25, where the added temporal delay introduced to the red rays is reduced as compared to the flat-grating system of FIG. 14. The two curved vertex elements 110 and 112 may be separated to create a region in which the different spectral pulse components are propagating parallel to each other but spatially separated. Hybrid phase plates may readily be introduced into this region to further tailor the spectral delay properties of the device. However, such a split vertex element is no longer Bragg-resonant.

Fine tuning the dispersive temporal delay properties of the various pulse compressors and delay lines previously discussed may be introduced by recording the holographic elements on flexible curved substrates. The first-order shape desired for the holographic element should be incorporated into its fabrication as illustrated in FIG. 3b. However higher order fine-tunings in this shape may be introduced by changing the curvature, for example by tuning screws, about a fulcrum as shown in FIG. 26, to peak the performance of the device.

The devices described in connection with FIGS. 14-26 may be used as chirpers. For example, an input pulse which is short and broad-band will exit as a chirped pulse, with a chirp profile which is controllable by selection of the element shapes. Similarly, general dispersive delay functions may be achieved.

Laser resonators or cavities are shown in FIGS. 27A-32 which have high diffraction efficiency and spectrally dispersive temporal delay programmability. A chirping device (e.g., an optical fiber or programmable grating based device) or medium 120 and a dispersive delay line 122 are incorporated inside the laser cavity illustrated in FIG. 27A. A counter-clockwise propagating mode is chirped and spectrally broadened in the single-mode fiber (or other chirping device) 120. The pulse is efficiently amplified in the gain medium 123 (which may be synchronously pumped) due to the pulse's longer temporal length. The pulse is then temporally compressed in the holographic delay line 122, which may be tailored to the actual spectral/temporal profile of the input pulse. The delay line used may consist of any of the devices discussed earlier and as shown on the hybrid phase plates (FIG. 20) or triangle configuration (FIG. 23) as shown in FIGS. 27A and 27B, respectively.

FIG. 28a illustrates a laser using shaped (e.g., cylindrically or spherically curved) volume holographic reflection elements 130 and 132 to form the cavity. By choice of the volume fringe structure, these elements may be made extremely narrow-band, broad-band, or multiple combinations of these may be superimposed. For example, the laser may be constructed to lase simultaneously in several wavelength bands (e.g., red, green and blue) by superimposing the appropriate volume fringe patterns in the same emulsion (recording medium of the gratings), or by cascading them. Further superimposed or cascaded gratings may be used to collimate or focus the output wavefront, as shown in FIG. 28b. Additionally, the holographic elements may be shaped to provide "programmable" spatial variation of resonator cavity length. This latter feature is illustrated in FIGS. 29a and b, where the cavity length increases radially outward from the center of the resonator.

Figure 30A:
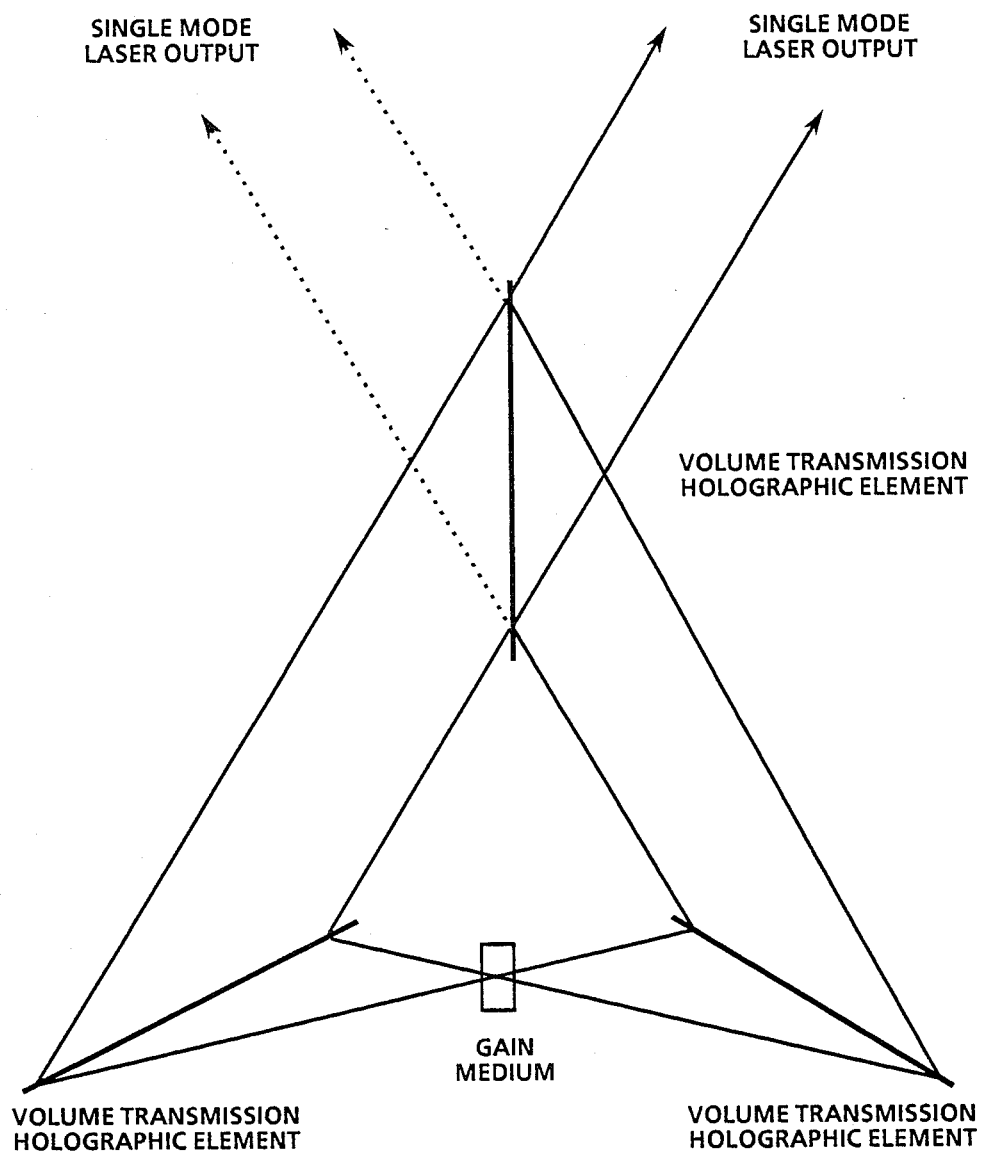
Figure 30B:
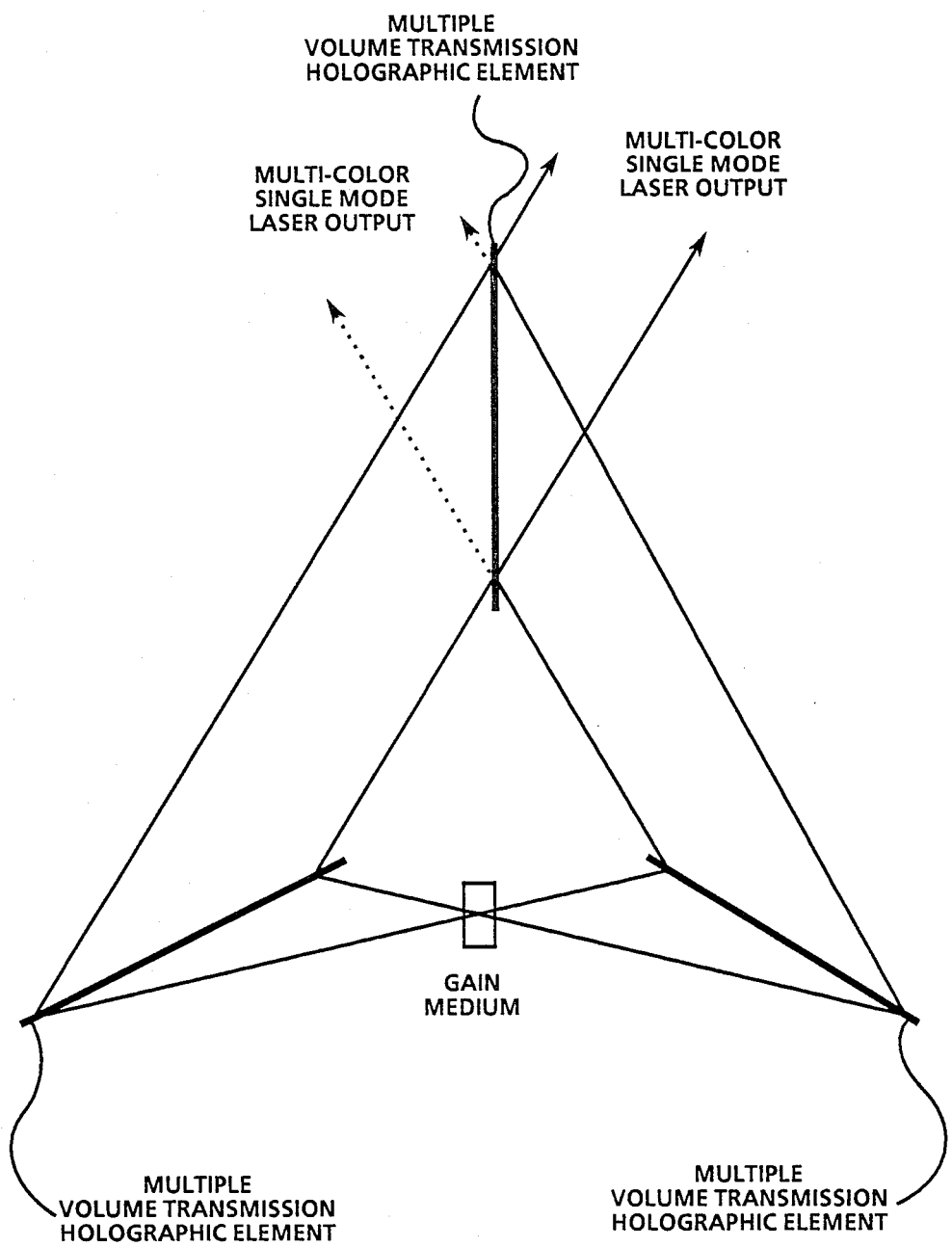
Figure 30C:
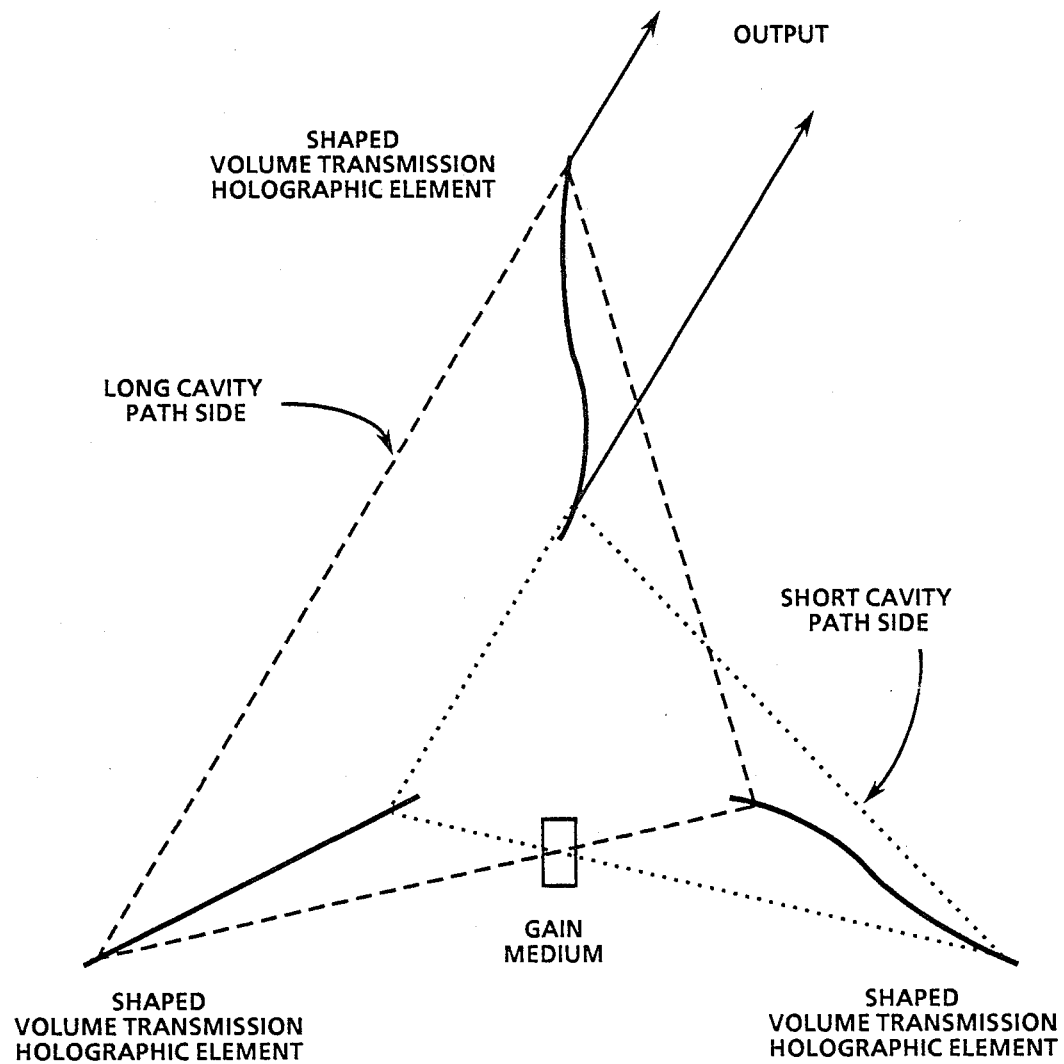

A laser resonator formed entirely from volume transmission holographic gratings is illustrated in FIG. 30A. This resonator has extreme dispersion which can reduce (e.g., to one) the number of longitudinal modes lasing, without the use of an etalon. The volume holographic elements provide efficiencies near unity which are not available with other dispersive elements, and the Brewster angle incidence can be chosen to eliminate surface losses and polarize the output beam. FIG. 30B illustrates a laser with the ability to simultaneously resonate at several close or widely separated wavelengths by using the multiplexing techniques (recording of different fringe patterns) described above in connection with FIG. 28. This configuration may also be constructed of shaped holographic elements, as shown in FIG. 30C, to provide variable spatial cavity length dependencies.

Figure 31A:
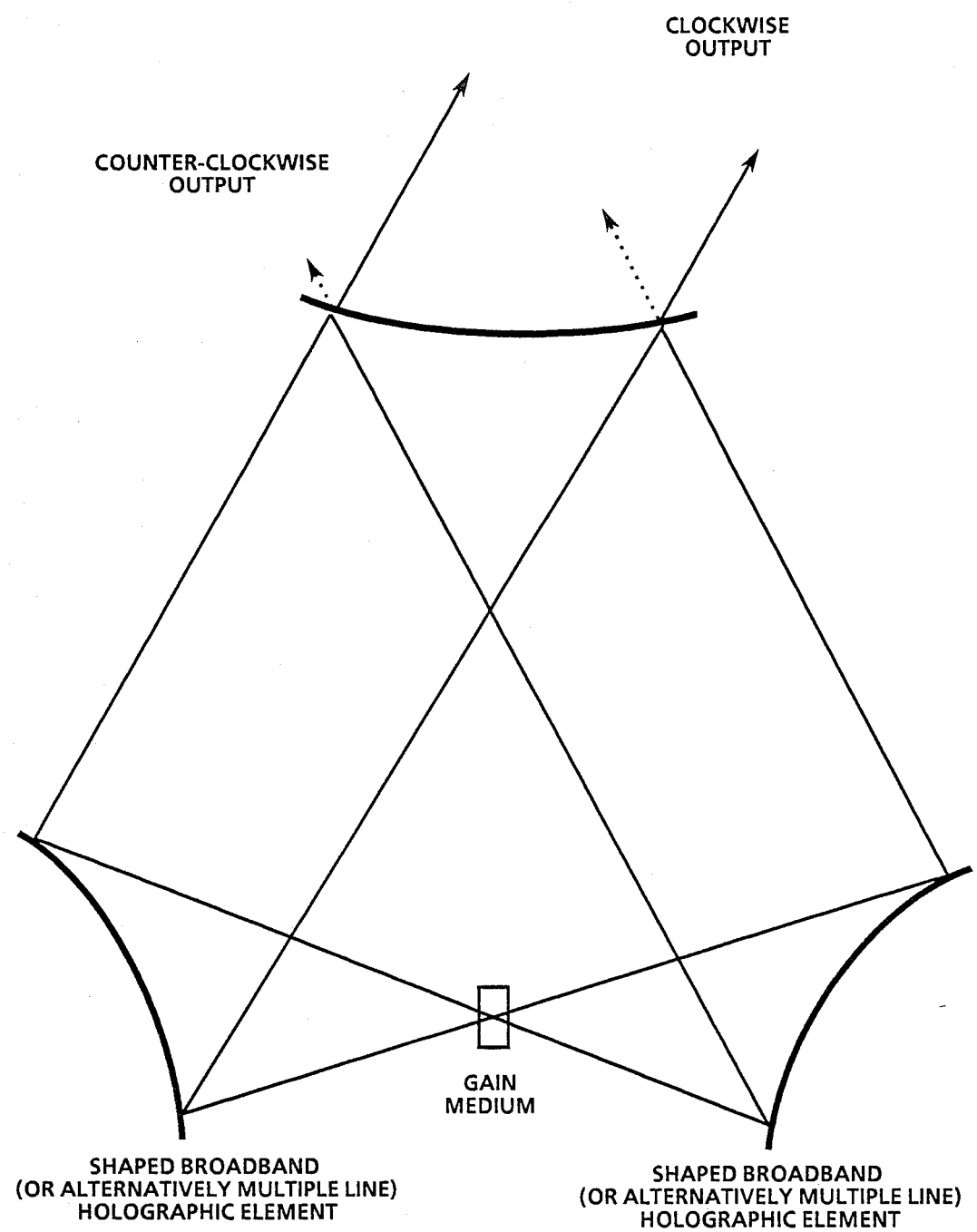
Figure 31B:
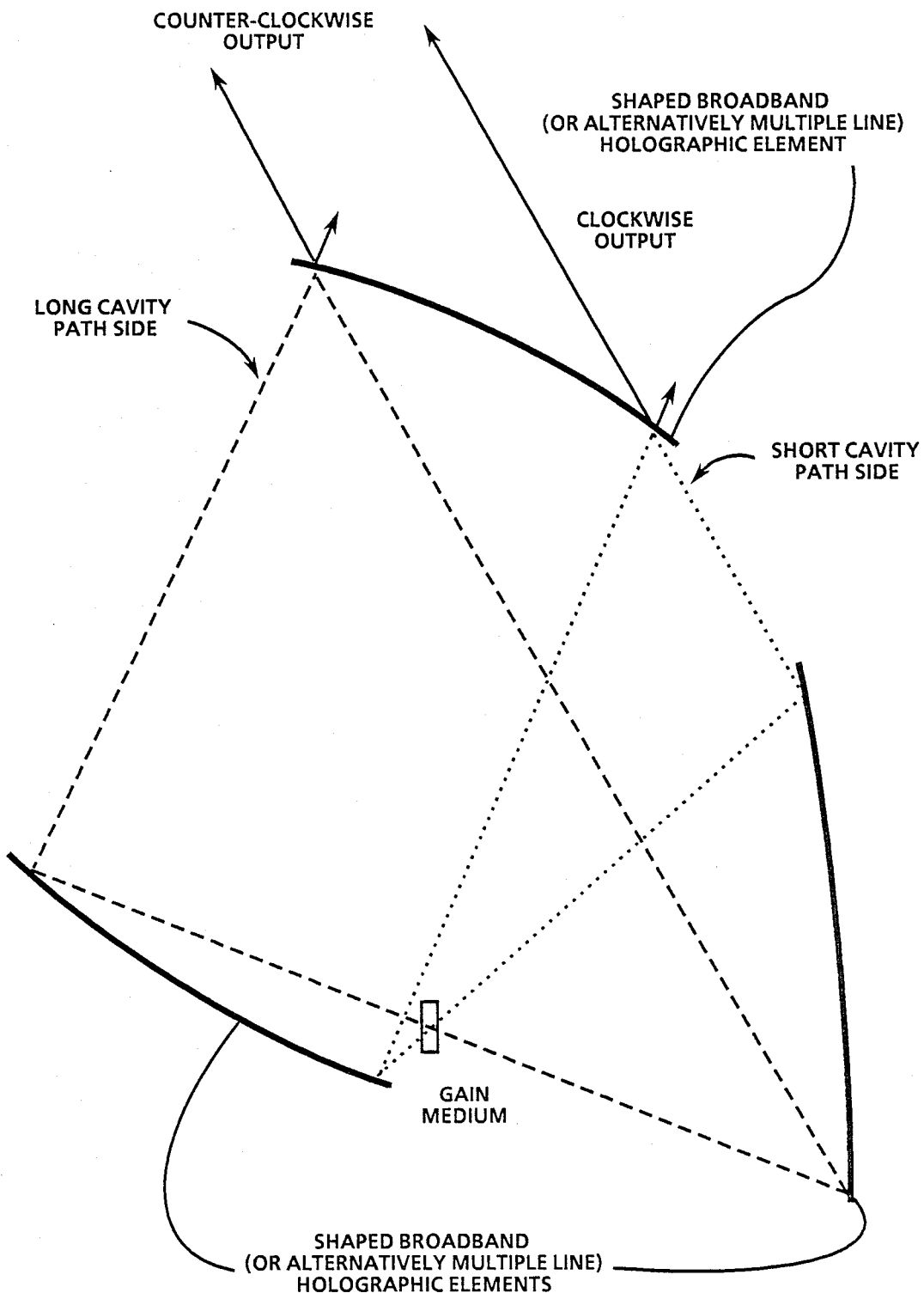

FIG. 31A shows a laser resonator with volume reflection elements. The reflection elements may narrow-band or broad-band, as discussed in connection with FIG. 11, and may also be multiple elements enabling simultaneous operation over several bands. As shown in FIG. 31B, these devices may also be configured to provide a large programmable variation in cavity length across the resonator.

Figure 32:
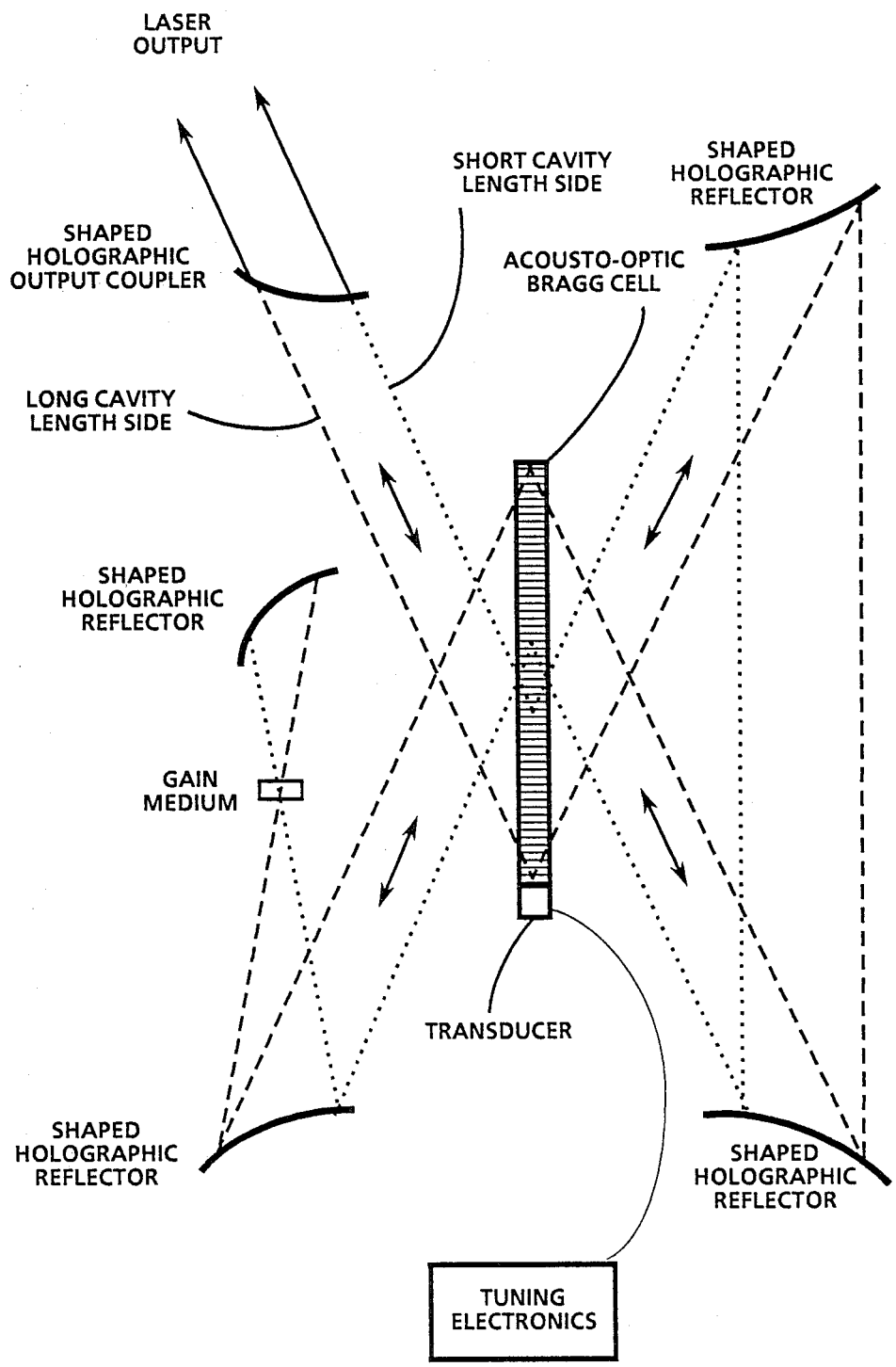

An electronically tunable laser resonator with capability for programmable spatial cavity length variations by the use of shaped reflective volume holographic elements is illustrated in FIG. 32. Here the Bragg-Resonant design assures peak efficiencies over vary broad bandwidths as discussed in the above referenced U.S. patent application. An additional feature is that the laser cavity length is stationary while tuning occurs to enable the broad spectral tuning of the laser without the occurrence of mode-hopping.

From the foregoing description it will be apparent that there has been provided improved optical systems, including delay lines, pulse compressors and chirpers and lasers wherein temporal and spatial characteristics of optical signals can be tailored with programmed volume holographic diffraction elements. Although a variety of systems embodying the invention have been disclosed, variations and modifications thereof, within the scope of the invention, will undoubtedly suggest themselves to those skilled in the art. Accordingly, the foregoing description should be taken as illustrative and not in a limiting sense.

We claim:

1. An optical system for providing a predetermined spatial and temporal shape to the profile of an optical signal which has a spatial and temporal shape of its profile different from said predetermined shape, said system comprising a volume diffraction element upon which said optical signal is incident, in which said optical signal is diffracted, and from which said diffracted optical signal propagates to an output region, said element having a fringe pattern in the volume thereof, and said volume following a surface, shaped along curves selected from flat and arcuate shapes, which matches said spatial and temporal shape of the profile of said incident signal to said predetermined spatial and temporal shape at said output region, and wherein said fringe pattern is fixed in space to provide a predetermined angle between the incidence angle of said incident signal and the diffraction angle of said diffracted signal, and said element surface being curved independently with respect to said fixed fringe pattern in space to provide said match.

2. The system according to claim 1 wherein said element is fabricated with fringe patterns resulting from interfering waves one along the direction of said incident signal and the other along the direction of said diffracted signal regardless of the curvature of said surface.

3. An optical system for providing a predetermined spatial and temporal shape to the profile of an optical signal which has a spatial and temporal shape of its profile different from said predetermined shape, said system comprising a volume diffraction element upon which said optical signal is incident, in which said optical signal is diffracted, and from which said diffracted optical signal propagates to an output region, said element having a fringe pattern in the volume thereof, and said volume following a surface, shaped along curves selected from flat and arcuate shapes, which matches the spatial and temporal shape of the profile of said incident signal to said predetermined spatial and temporal shape at said output region, and wherein said system is a delay line for said optical signal having a plurality of components of different wavelength, said output signal having said wavelength components as said output region which are delayed with respect to said incident signal and have delays corresponding to the curvature of the surface of said element.

4. The system according to claim 3 wherein said holographic element has a fringe pattern selected from the group consisting of a uniformly spaced fringes relatively narrow and relatively broadband structure, respectively.

5. An optical system for providing a predetermined spatial and temporal shape to the profile of an optical signal which has a spatial and temporal shape of its profile different from said predetermined shape, said system comprising a volume diffraction element upon which said optical signal is incident, in which said optical signal is diffracted, and from which said diffracted optical signal propagates to an output region, said element having a fringe pattern in the volume thereof, and said volume following a surface, shaped along curves selected from that and arcuate shapes, which matches said spatial and temporal shape of the profile of said incident signal to said predetermined spatial and temporal shape at said output region, and wherein said element comprises a substrate having a surface with said curvature, and a medium having a fringe pattern in the volume thereof neighboring said surface.

6. An optical system for providing a predetermined spatial and temporal shape to the profile of an optical signal which has a spatial and temporal shape of its profile different from said predetermined shape, said system comprising a volume diffraction element upon which said optical signal is incident, in which said optical signal is diffracted, and from which said diffracted optical signal propagates to an output region, said element having a fringe pattern in the volume thereof, and said volume following a surface, shaped along curves selected from flat and arcuate shapes, which matches said spatial and temporal shape of the profile of said incident signal to said predetermined spatial and temporal shape at said output region, and wherein said system comprises a plurality of said diffracting elements in cascade, at least some of said elements being curved to provide said predetermined shape from the signal diffracted to said region by the last of said elements.

7. The system according to claim 6 wherein said elements are all volume transmission holographic elements.

8. The system according to claim 6 wherein said elements are all volume reflection holographic elements.

9. The system according to claim 6 further comprising an optical device selected from the group consisting of refractive and dispersive devices in cascade with said holographic element for refracting or dispersing at least one of said incident and diffracted signals.

10. The system according to claim 9 wherein said optical device provides a substrate surface having predetermined curvature on which said holographic element is disposed.

11. The system according to claim 10 wherein said device is a refractive element which refracts at least one component of said signal at said surface at an angle of refraction equal to the diffraction angle of said holographic element so that said signal enters and leaves said elements along straight lines.

12. The system according to claim 10 wherein said optical device is a triangular prism having surfaces on adjacent sides thereof, said holographic element being disposed on said adjacent sides.

13. The system according to claim 10 wherein said optical device comprises a pair of prisms having sides which sandwich said holographic element therebetween.

14. The system according to claim 10 wherein said optical device is a body of transparent material having a prescribed curvature on one surface thereof, said holographic element being disposed on said one surface.

15. The system according to claim 14 wherein said holographic element is a volume reflection element.

16. The system according to claim 10 wherein said optical device is a lens.

17. An optical system for providing a predetermined spatial and temporal shape to the profile of an optical signal which has a spatial and temporal shape of its profile different from said predetermined shape, said system comprising a volume diffraction element upon which said optical signal is incident, in which said optical signal is diffracted, and from which said diffracted optical signal propagates to an output region, said element having a fringe pattern in the volume thereof, and said volume following a surface, shaped along curves selected from flat and arcuate shapes, which matches said spatial and temporal shape of the profile of said incident signal to said predetermined spatial and temporal shape at said output region, and wherein said signal is an optical pulse and said system is operative to change the temporal profile of said optical pulse, and including at least one plurality of grating elements for dispersing said pulse into a collimated beam having components of different wavelength across the path of propagation thereof and for recombining said collimated beam to provide an output pulse having said changed profile.

18. The system according to claim 17 wherein a provided for retro-reflecting said collimated beam through said plurality of elements for the recombination thereof.

19. The system according to claim 17 wherein a first and a second of said plurality of elements is provided for producing said collimated beam and for recombining said collimated beam.

20. The system according to claim 17 wherein at least one of said plurality of elements has a curvature different from the other of said plurality of elements.

21. The system according to claim 20 wherein said one element has an arcuately curved surface and the others of said plurality of elements are flat.

22. The system according to claim 17 wherein said plurality of elements includes a plurality of grating in cascade for dispersing said components to successively greater extents and directing the components dispersed from the last element of said cascade upon another element having a predetermined curvature across the aperture through which said pulse passes.

23. The system according to claim 22 wherein said cascade of elements and said other elements are disposed in a spiraling array.

24. The system according to claim 17 further comprising a hybrid device consisting of a device selected from the group consisting of refractive elements (including prisms) and refractive elements, and a volume holographic element in the path of said collimated beam.

25. The system according to claim 24 wherein said hybrid device has means for inserting a spectral delay in a sense opposite to the delay due to said plurality of elements.

26. The system according to claim 17 wherein one of said plurality of elements is disposed upon a flexible substrate curved to a mean shape, and means for flexing said substrate to vary the curvature thereof.

27. An optical system providing a predetermined spatial and temporal shape to the profile of an optical signal which has a spatial and temporal shape of its profile different from said predetermined shape, said system comprising a volume diffraction element upon which said optical signal is incident, in which said optical signal is diffracted, and from which said diffracted optical signal propagates to an output region, said element having a fringe pattern in the volume thereof, and said volume following a surface, shaped along curves selected from flat and arcuate shapes, which matches said spatial and temporal shape of the profile of said incident signal to said predetermined spatial and temporal shape at said output region, and wherein a plurality of said elements are provided in cascade, and intermediate one of said elements in said plurality of elements defining the vertex and the remaining ones of said elements defining the base of a triangular configuration.

28. The system according to claim 27 wherein a plurality of sets of said plurality of elements in said triangular configurations are disposed in cascade.

29. The system according to claim 27 wherein said vertex elements have fringes and red disposed at the Bragg resonant condition with respect to different wavelengths refracted from and to said base elements.

30. The system according to claim 27 wherein said vertex element comprises a pair of shaped elements.

31. An optical system for providing a predetermined spatial temporal shape to the profile of an optical signal which has a spatial and temporal shape of its profile different from said predetermined shape, said system comprising a volume diffraction element upon which said optical signal is incident, in which said optical signal is diffracted, and from which said diffracted optical signals propagates to an output region, said element having a fringed pattern in the volume thereof, and said volume following a surface, shaped along curves selected from flat and arcuate shapes, which matches said spatial and temporal shape of the profile of said incident signal to said predetermined spatial and temporal shape at said output region, and wherein said system is a laser resonator having a gain medium, said element being disposed in said resonator.

32. The system according to claim 31 further comprising means in said resonator for chirping the laser signals propagating therein at least one direction.

33. The system according to claim 32 wherein said element is included in an optical delay line according to claim 3.

34. The system according to claim 32 wherein said element is included in an optical pulse temporal profile changer in accordance with claim 18.

35. The system according to claim 31 wherein a plurality of said elements are provided, each defining a volume holographic reflective grating at an opposite end of said cavity.

36. The system according to claim 31 wherein said gratings each have a plurality of fringe patterns to support the propagation of a plurality of different wavelengths in said cavity.

37. The system according to claim 31 wherein a plurality of said elements are provided, each being a volume transmission element and each being disposed to define a different corner of a ring cavity.

38. The system according to claim 37 wherein at least one of said gratings has a surface of different curvature than the others.

39. The system according to claim 31 wherein a plurality of said gratings are provided, each defining a different corner of a ring cavity, each having an arcuate curvature, and each being a volume reflection grating.

40. The system according to claim 39 further comprising an acousto-optic Bragg cell in said cavity in the path of retro-reflected beams from said gratings.

* * * * *